Aug. 23, 1932.   A. F. LARSON ET AL   1,873,432
TALKING MACHINE
Filed Aug. 19, 1927   18 Sheets-Sheet 8
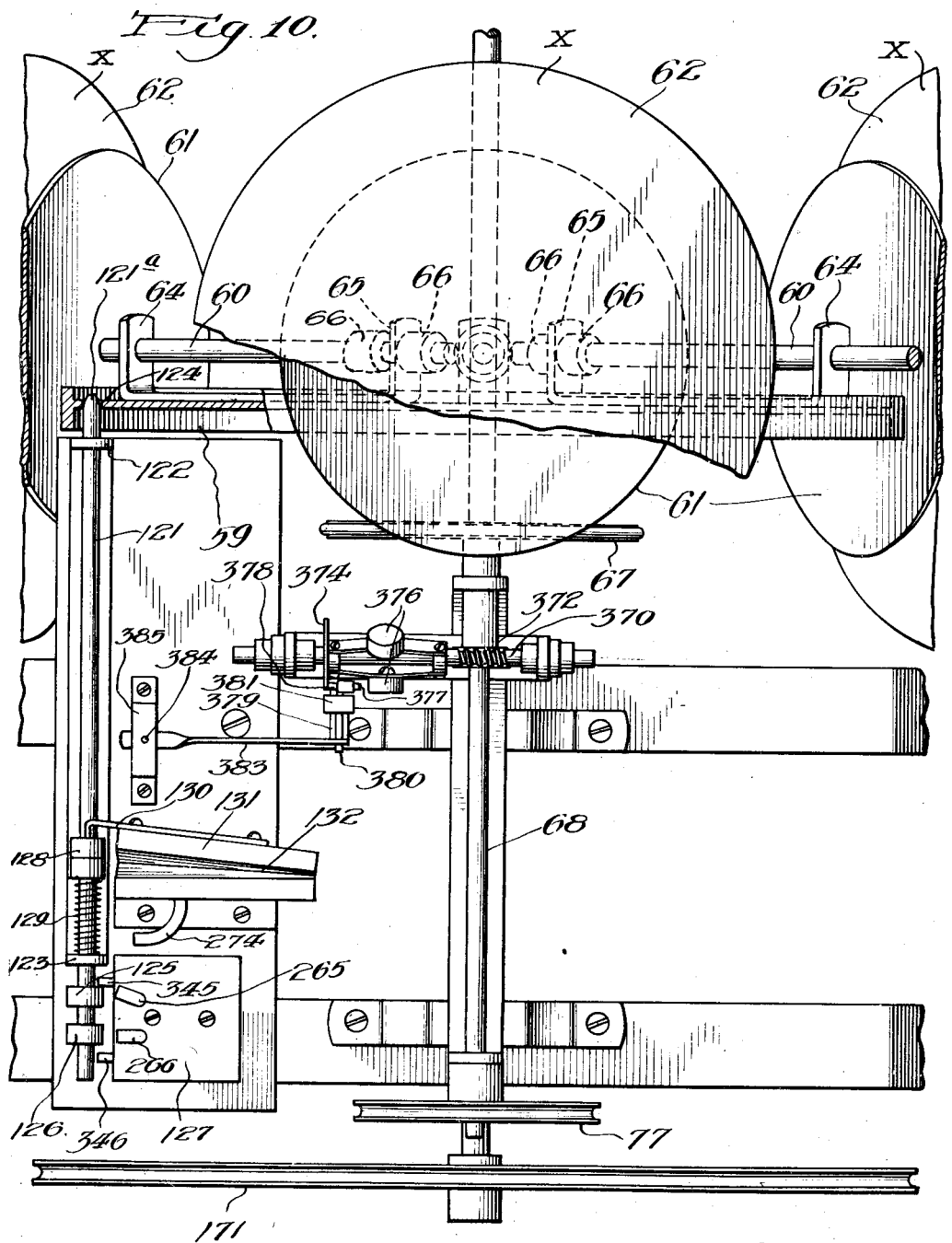

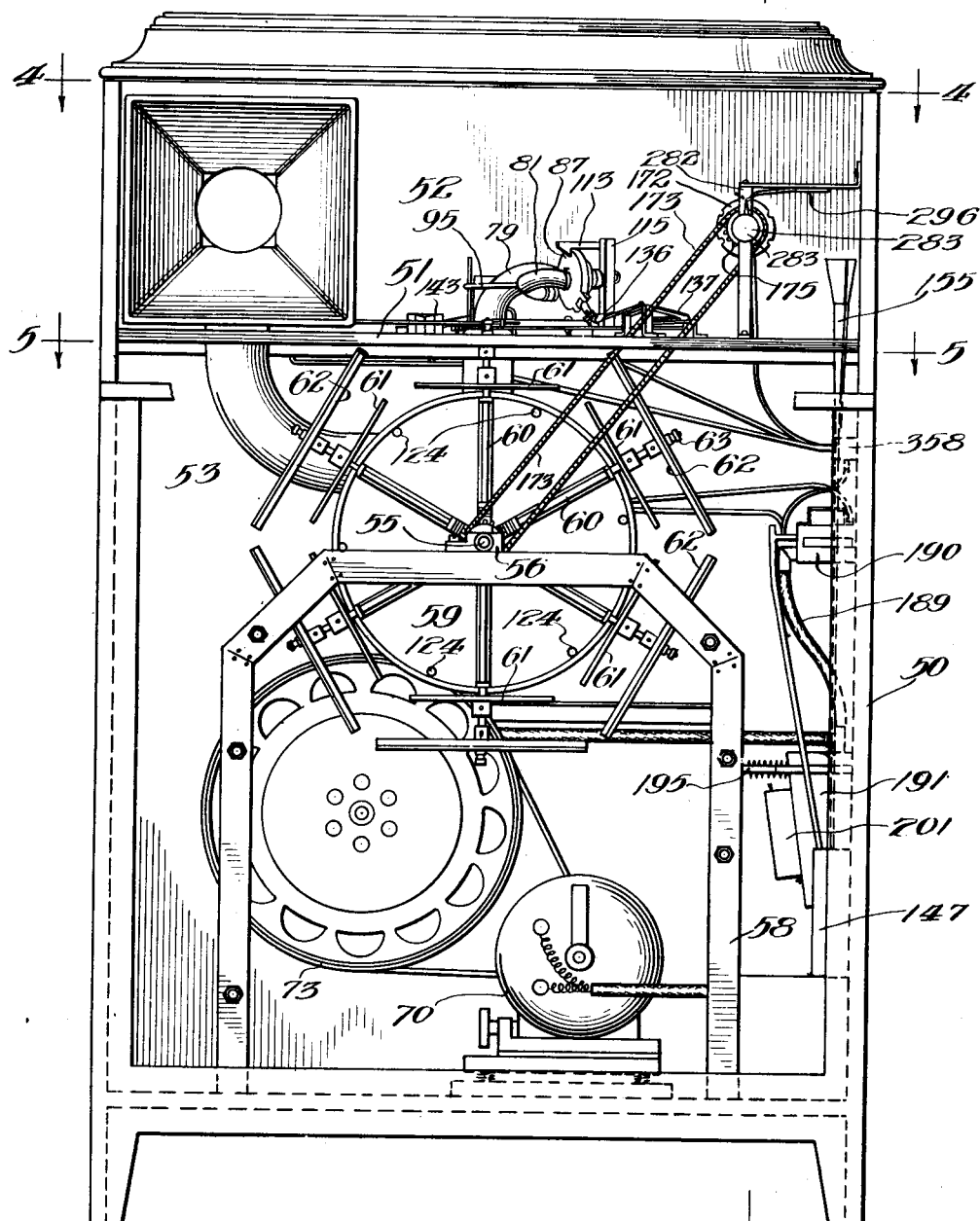

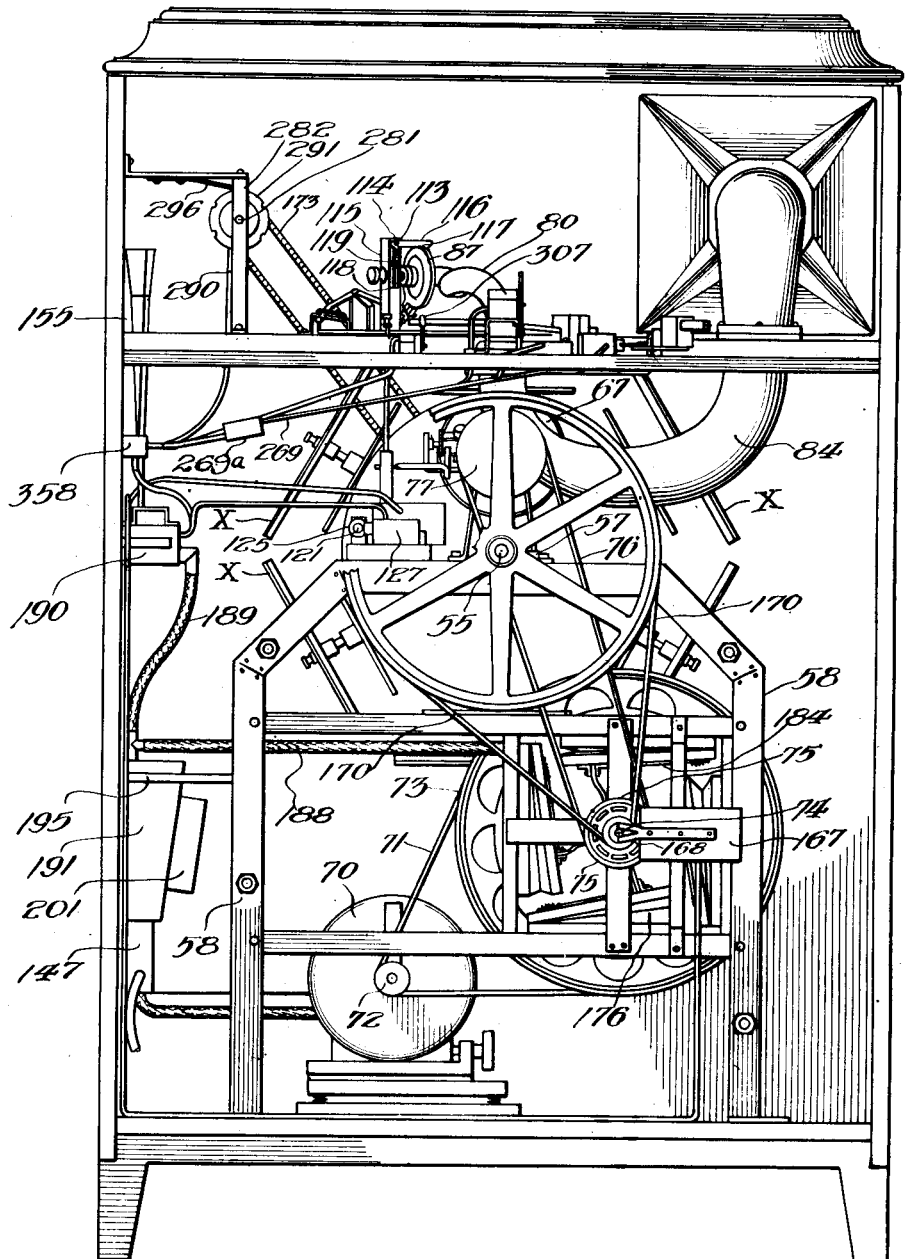

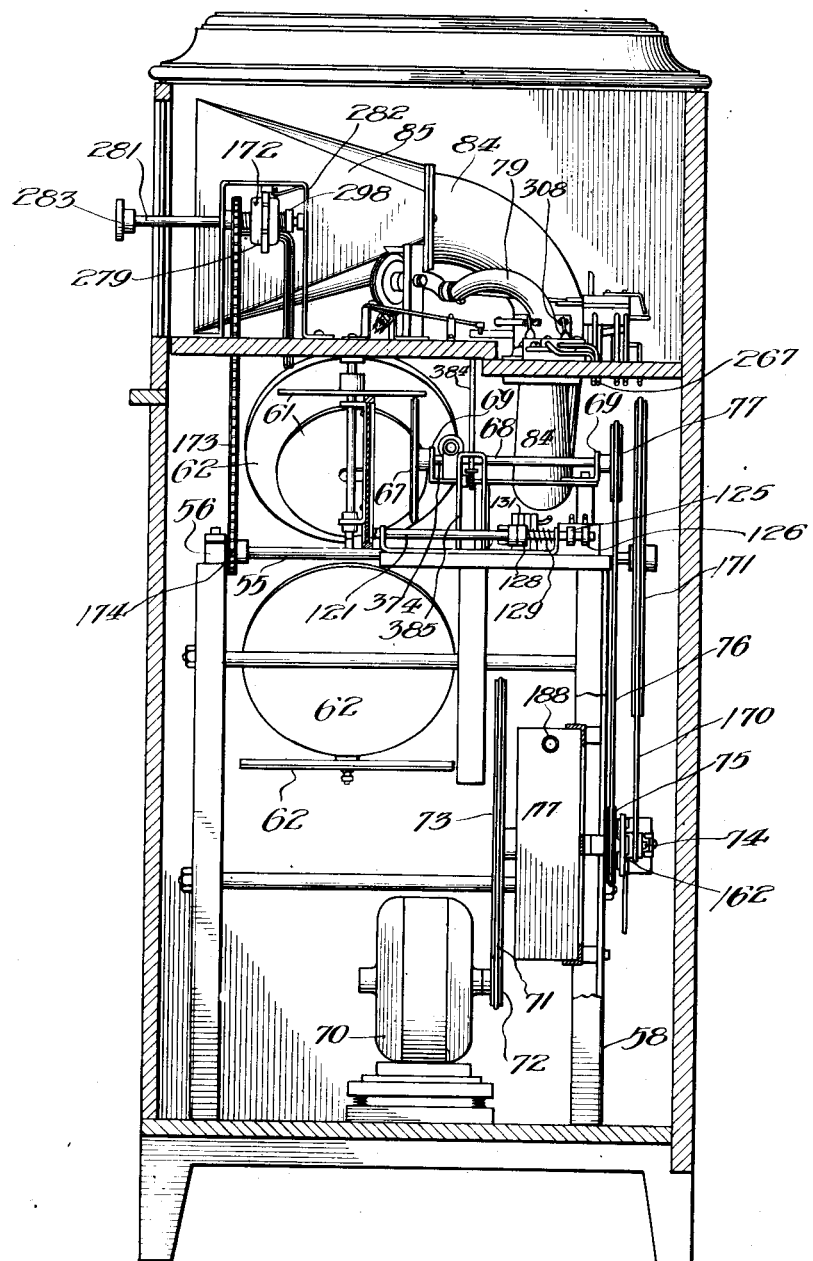

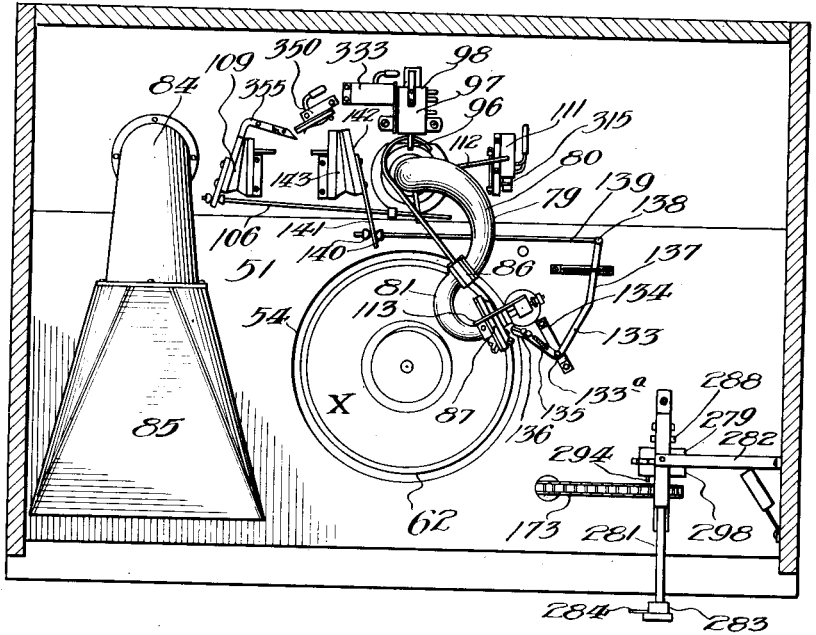
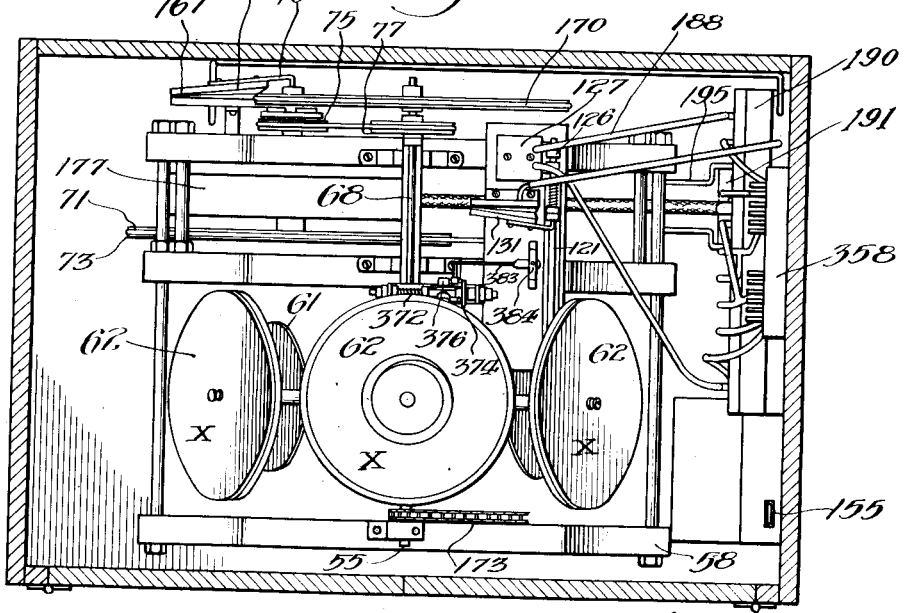

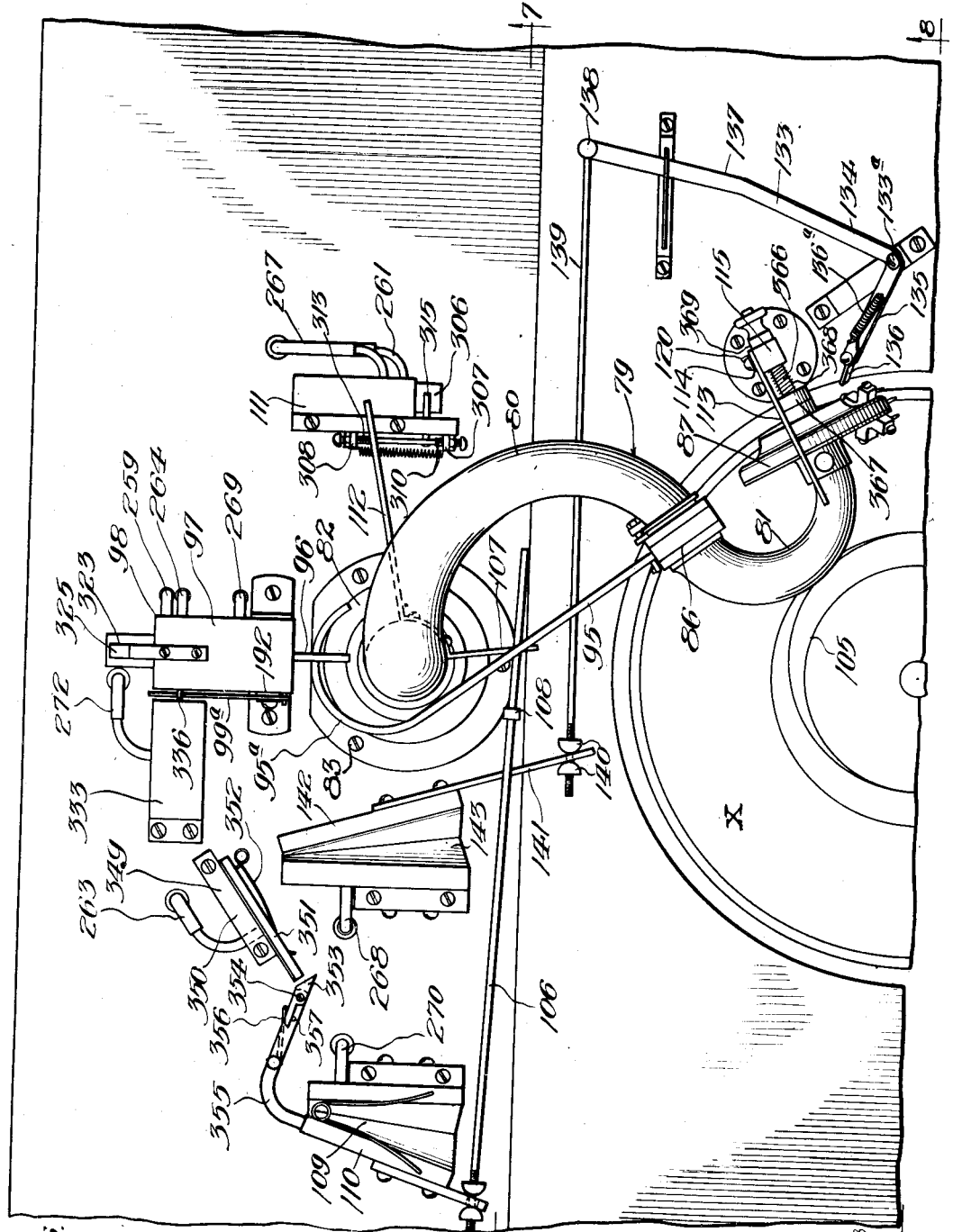

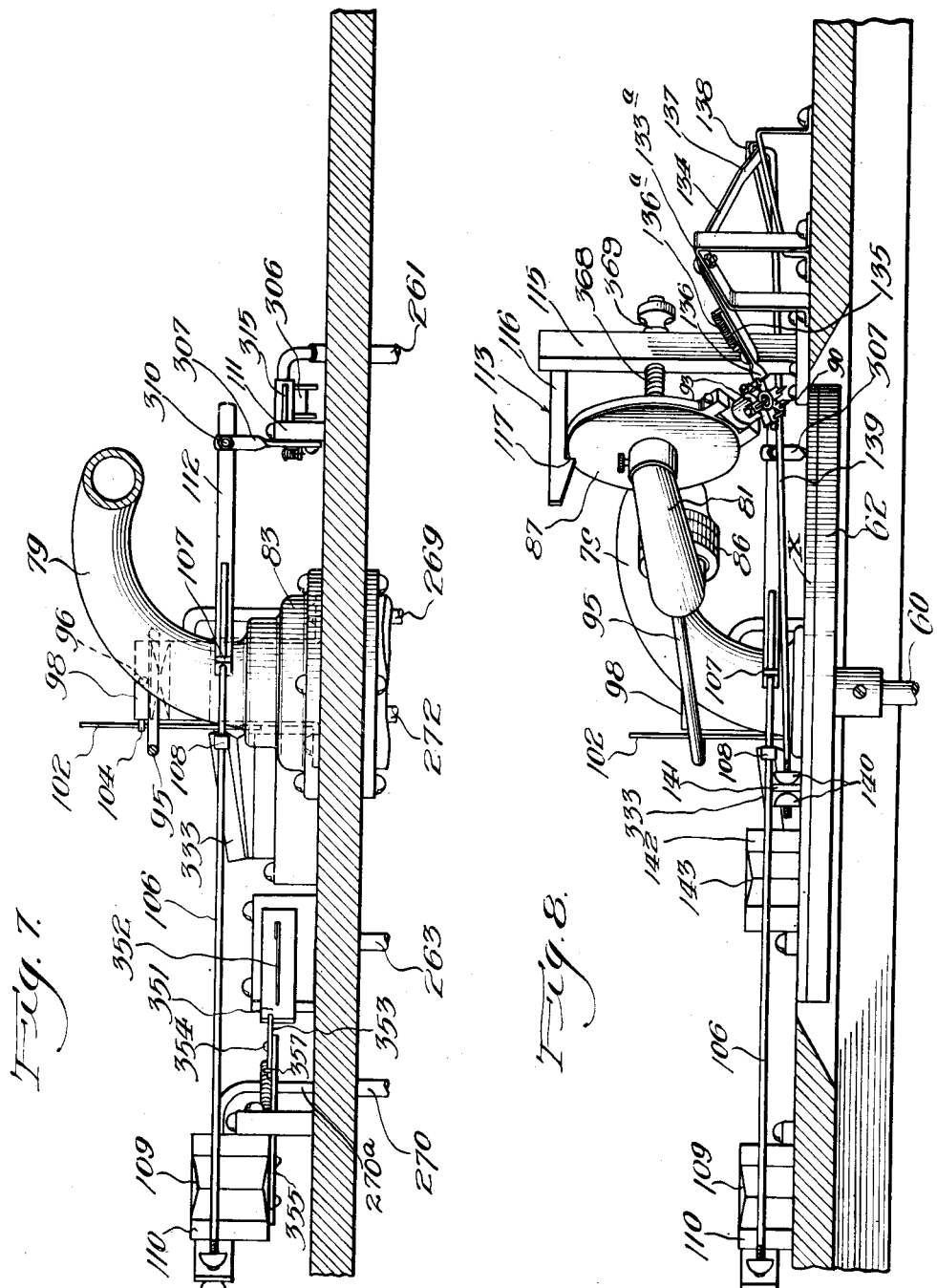

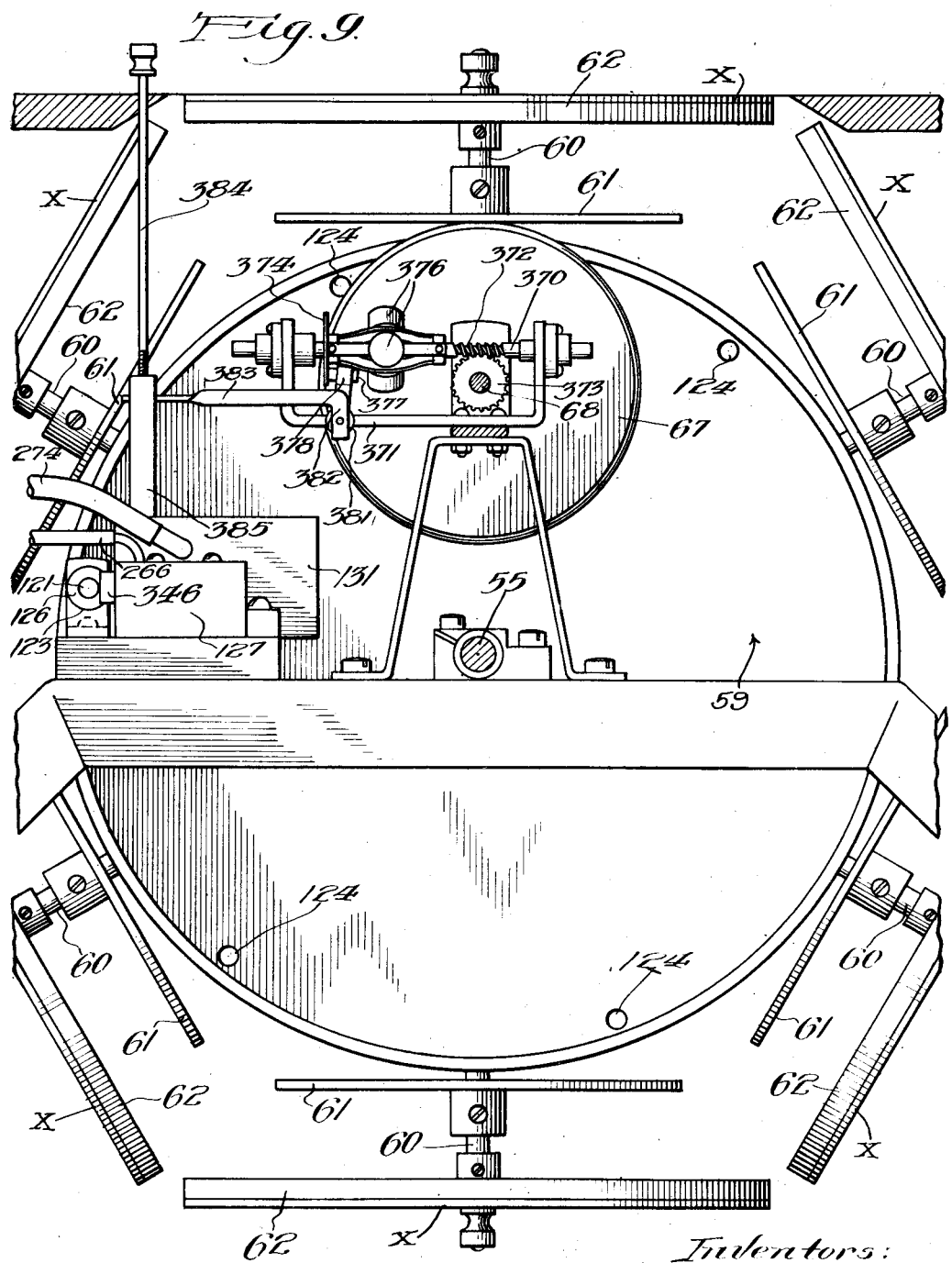

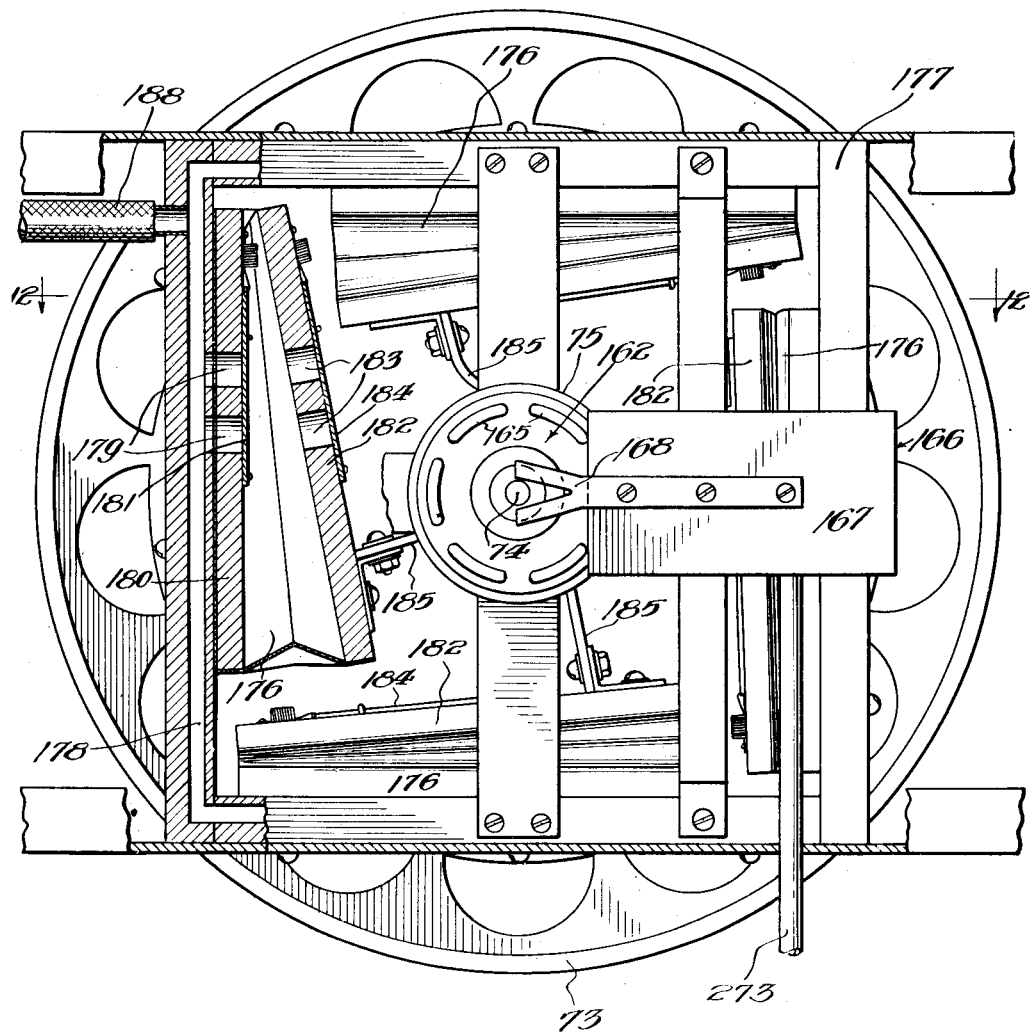
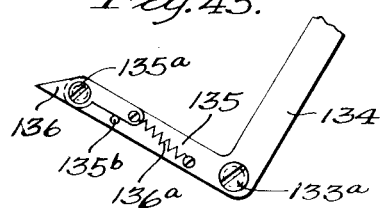

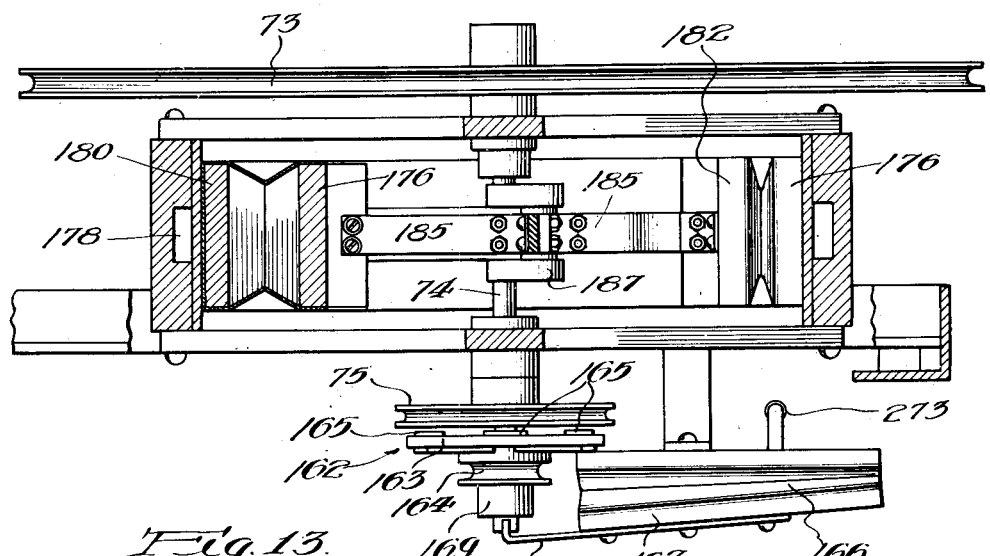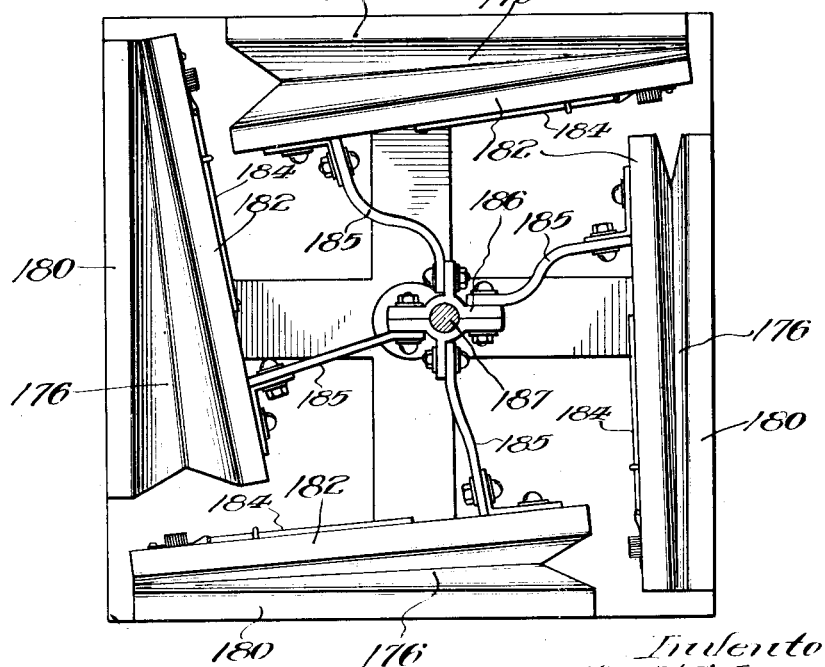

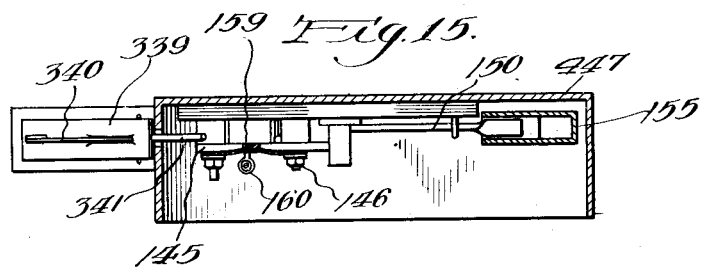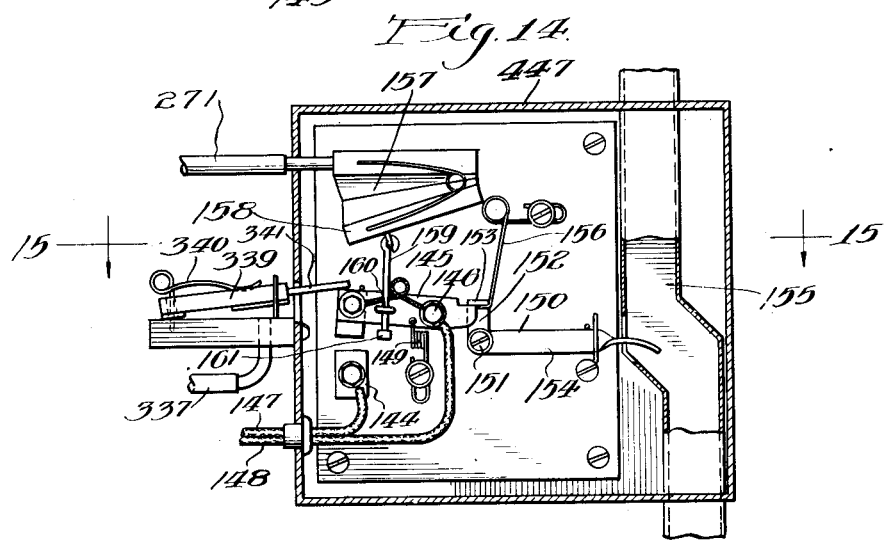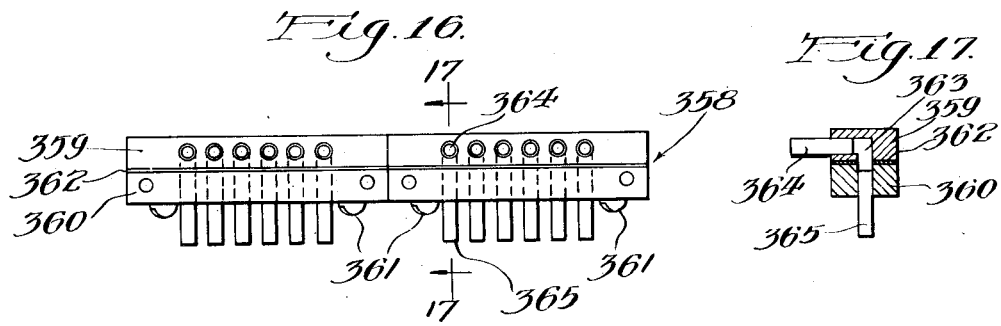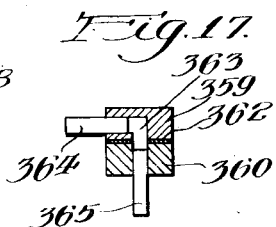

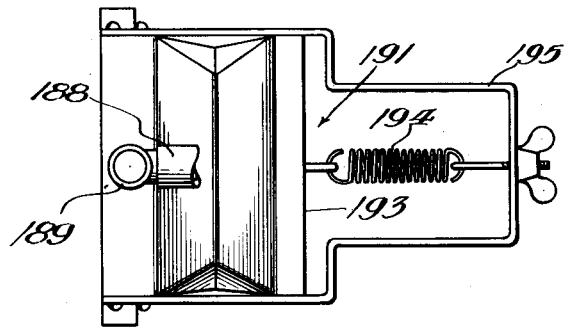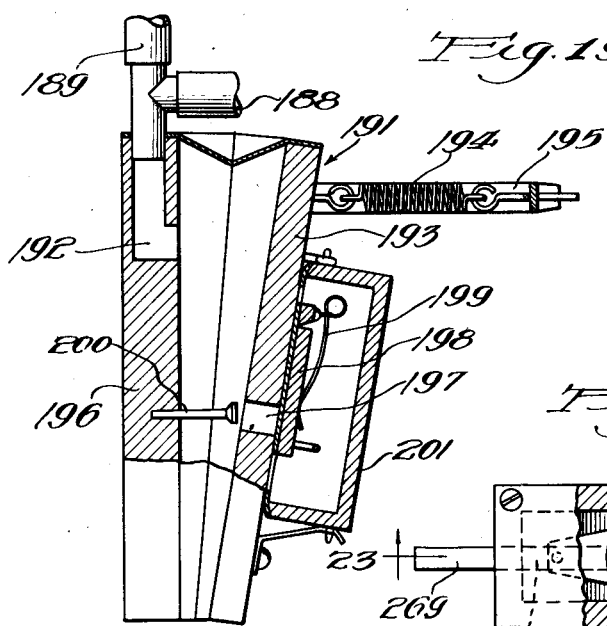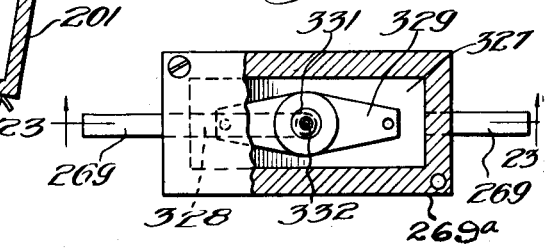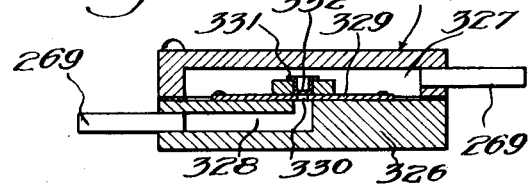

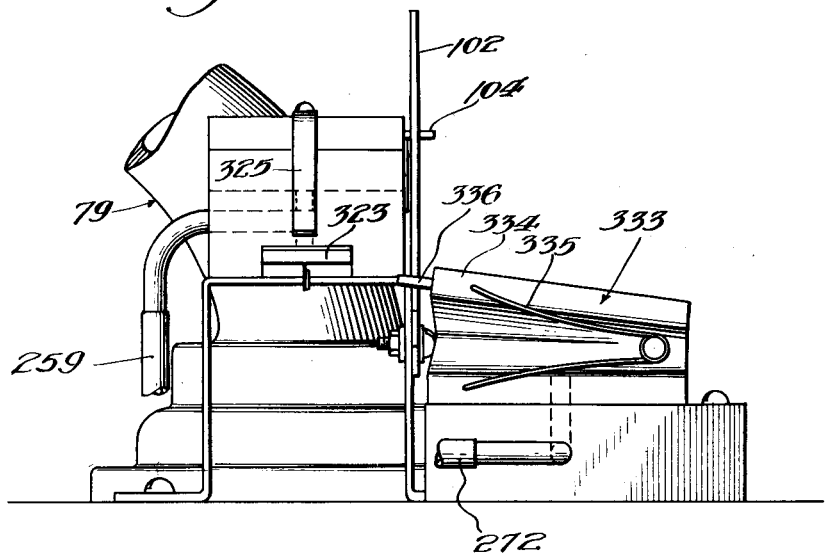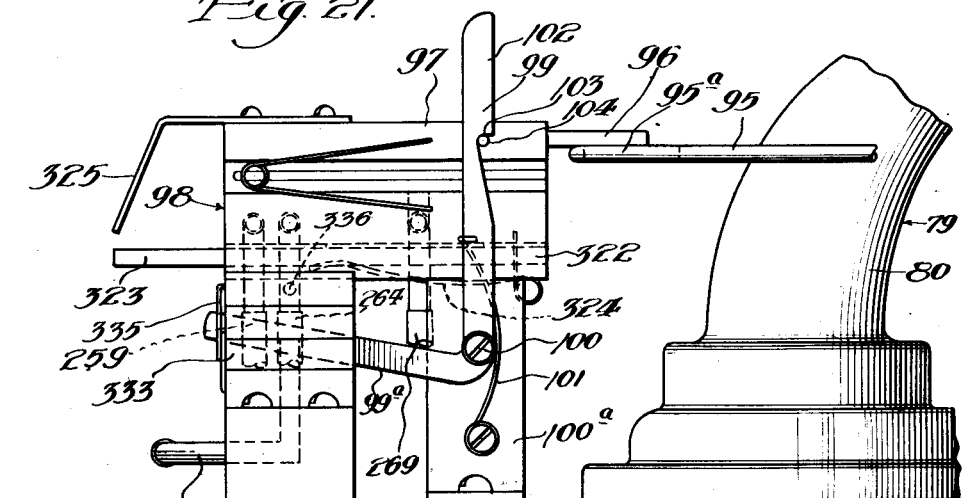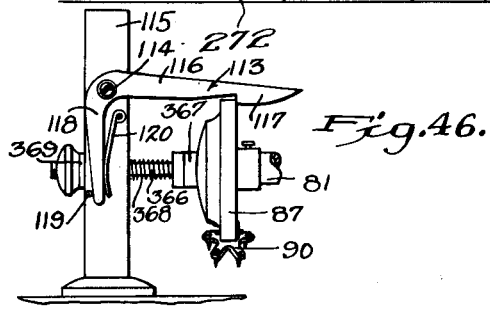

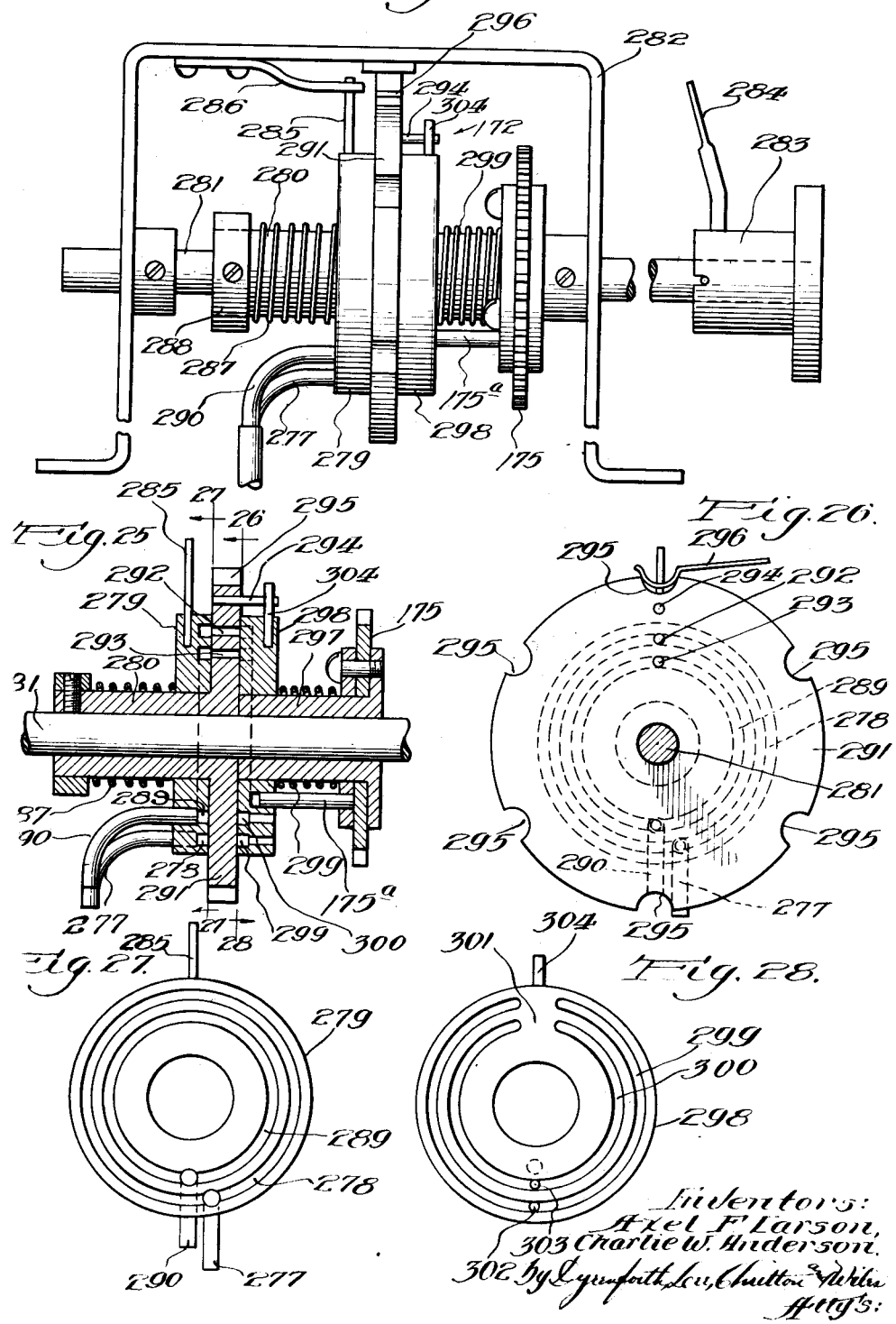

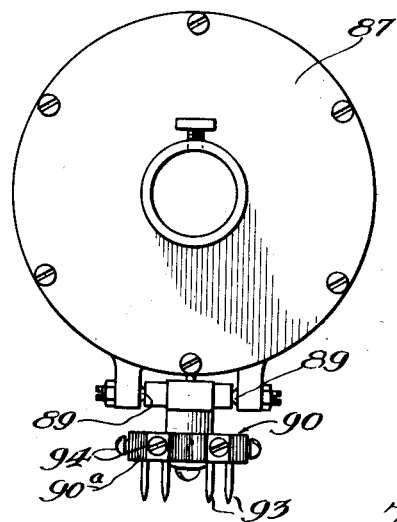
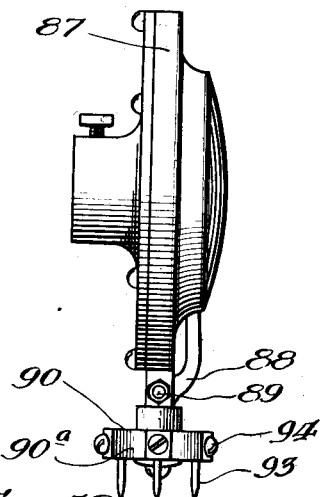
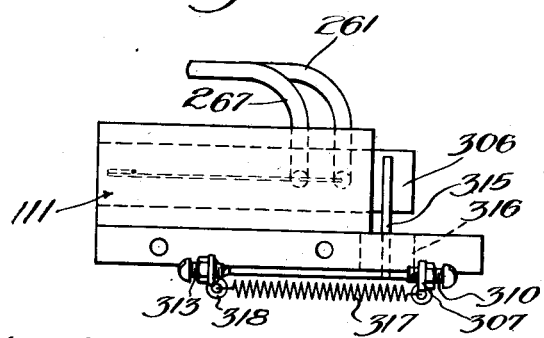
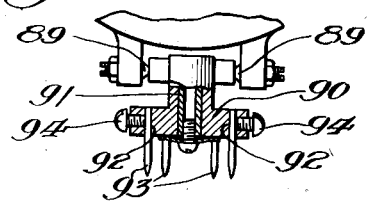
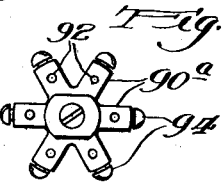
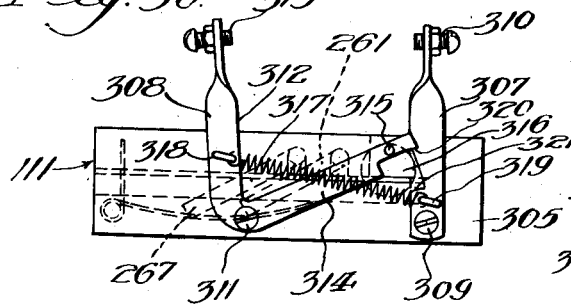
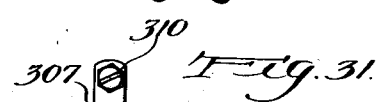

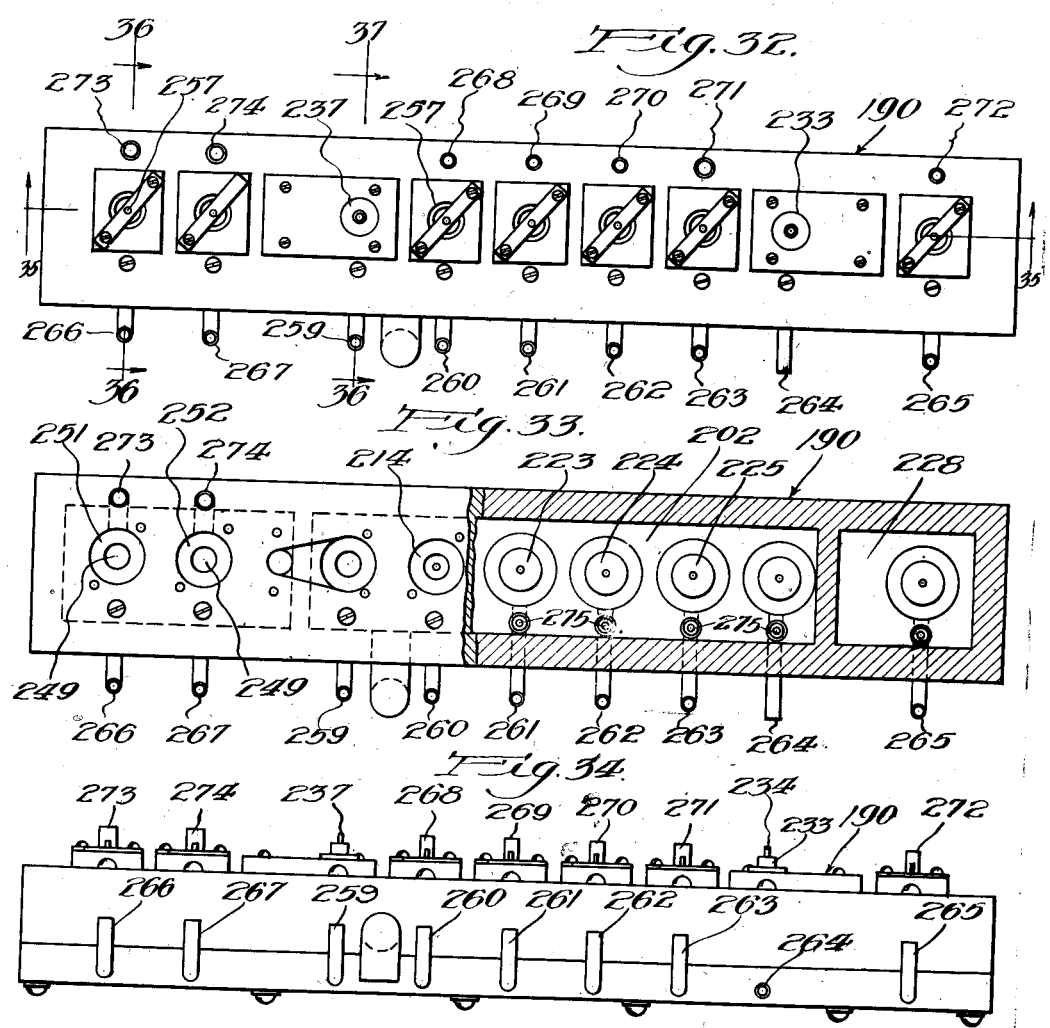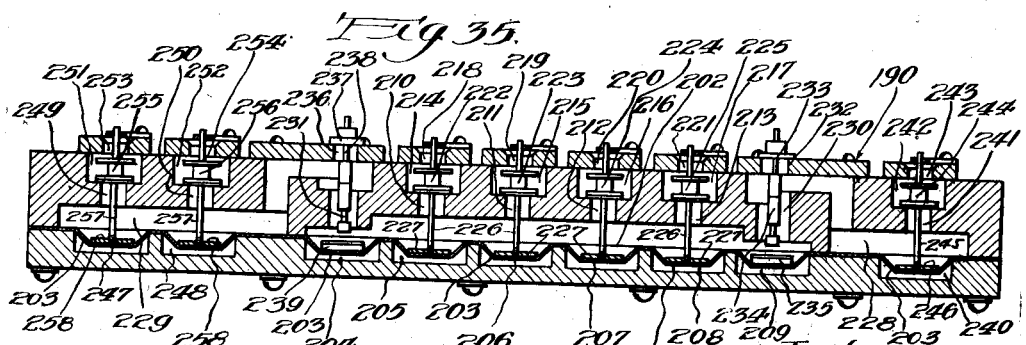

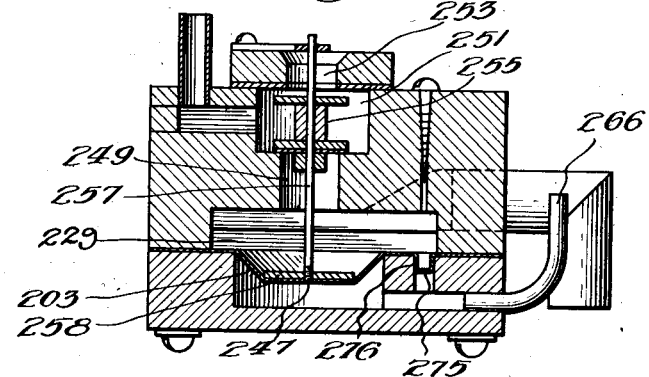
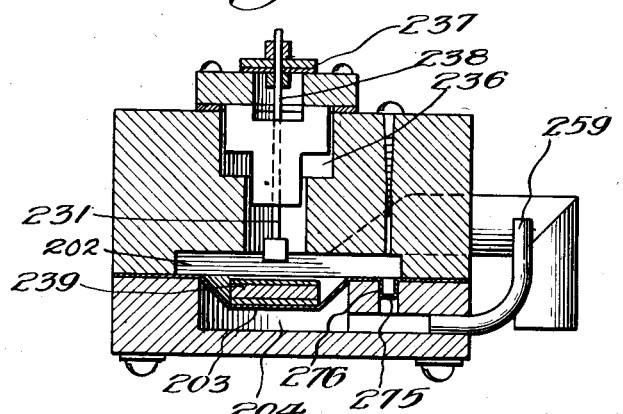
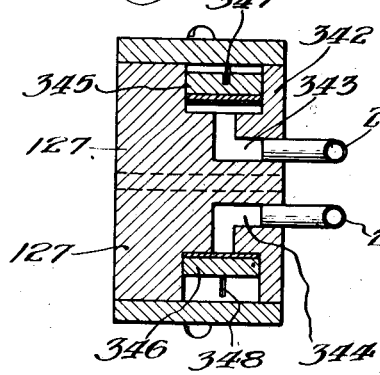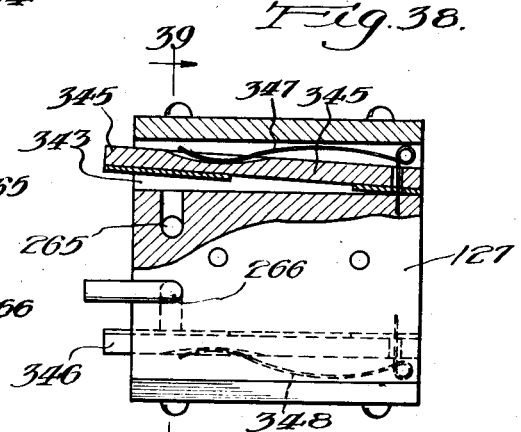

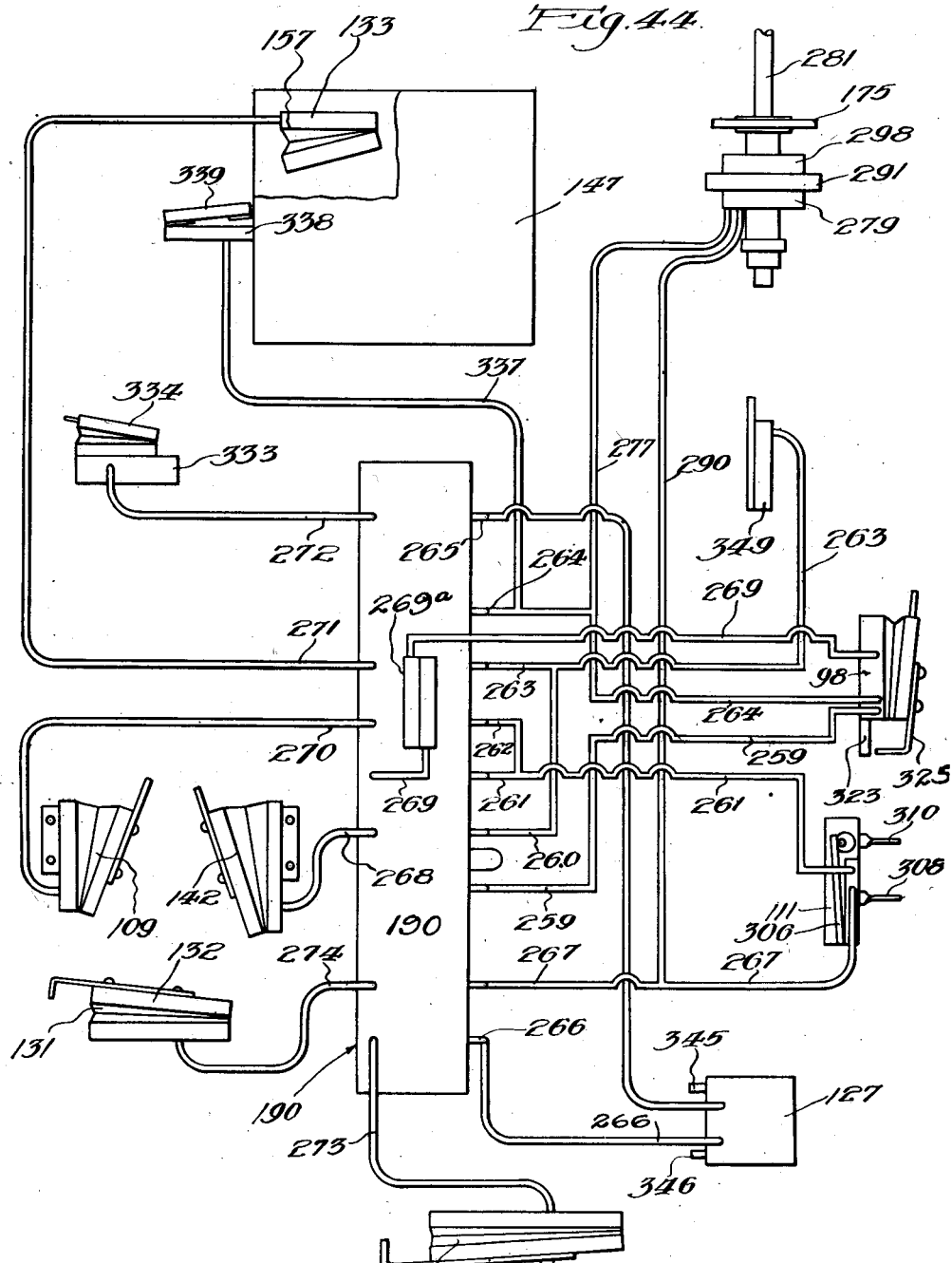

Patented Aug. 23, 1932

1,873,432

UNITED STATES PATENT OFFICE

AXEL F. LARSON AND CHARLIE W. ANDERSON, OF CHICAGO, ILLINOIS, ASSIGNORS TO WESTERN ELECTRIC PIANO COMPANY, OF CHICAGO, ILLINOIS, A CORPORATION OF ILLINOIS

TALKING MACHINE

Application filed August 19, 1927. Serial No. 214,066.

Our invention relates more particularly to talking machines employing record-disks and more especially to talking machines of the record-disk magazine type.

The object, generally stated, is to provide improvements in machines of the general character above stated to the end that they will be better adapted for satisfactory and positive operation.

Certain of the specific objects are to provide improved means for effecting the automatic playing of a plurality of records in succession; to provide improved means for effecting selective operation of the various records charged into the magazine; to provide for the operation of the machine pneumatically to the end that the operation thereof will be more positive and likelihood of impairment of the machine minimized; to provide improvements in the record-changing means; the means for removing the stylus or needle from the record after the playing of the latter; the returning of the stylus or needle and the tone arm to normal position and the lowering of the stylus or needle for the next playing operation; and other objects as will be manifest from the following description.

Referring to the accompanying drawings:

Figure 1 is a front view of a machine constructed in accordance with my invention, the front of the casing thereof being removed to disclose interior details. Figure 2 is a rear view of the machine with the backboard of the casing removed. Figure 3 is a view in sectional elevation of the machine, the section being taken at the line 3—3 on Fig. 1 and viewed in the direction of the arrows. Figure 4 is a plan sectional view taken at the line 4—4 on Fig. 1 and viewed in the direction of the arrows. Figure 5 is a plan sectional view taken at the line 5—5 on Fig. 1 and viewed in the direction of the arrows. Figure 6 is an enlarged view, like Fig. 4, of certain of the mechanisms therein shown. Figure 7 is a sectional view taken at the line 7—7 on Fig. 6 and viewed in the direction of the arrows, the bellows for turning the needle-holder being omitted. Figure 8 is a section taken at the line 8—8 on Fig. 6 and viewed in the direction of the arrows. Figure 9 is a broken enlarged rear elevational view of the rotatable record carrier mechanism or magazine, of the machine, with certain parts shown in section. Figure 10 is a top plan view of the mechanism shown in Fig. 9, with a portion thereof broken away to disclose certain details. Figure 11 is an enlarged view in rear elevation of the air pump and the clutch through which rotation of the record magazine is effected, certain parts of the air-pump being sectioned. Figure 12 is a plan, sectional, view of the pump mechanism, the view being taken at the line 12—12 on Fig. 11 and viewed in the direction of the arrows. Figure 13 is a rear elevational view of the pump mechanism of Fig. 11, the actuating shaft therefor being shown in section. Figure 14 is a view in sectional elevation of coin-controlled mechanism by which the starting and stopping of the machine may be automatically controlled. Figure 15 is a plan, sectional, view of the mechanism of Fig. 14, the section being taken at the line 15 on Fig. 14 and viewed in the direction of the arrows. Figure 16 is a plan view of a tubing-block forming a part of the machine. Figure 17 is a section taken at the line 17 on Fig. 16 and viewed in the direction of the arrow. Figure 18 is a plan view of a suction-regulating bellows forming a part of the machine and provided for the purpose of controlling the amount of suction produced in the machine by the operation of the pump of Figs. 11, 12 and 13. Figure 19 is a view in vertical sectional elevation of the mechanism of Fig. 18. Figure 20 is a rear view, with certain parts broken away, of the pneumatic mechanism by which the reproducer head of the machine is raised to lift the needle from the record at the conclusion of the playing of the latter and locked in raised position following which this head and the tone-arm are swung toward the outer edge of the record, and pneumatic mechanism by which the reproducer head is released for movement toward the record to seat the needle in the record-groove. Fig. 21 is a view in side elevation of the mechanism of Fig. 20 which is viewed from the right in this figure. Figure 22 is a plan view, partly sectioned, of a bleed-valve located in one of the pneumatic-pipes of the machine. Figure 23 is a section taken at the line 23 on Fig. 22 and viewed in the direction of the arrow. Figure 24 is a detailed view of the valve mechanism which controls the rotatable record carrier mechanism or record magazine, the valve mechanism shown being viewed from the left-hand side of Fig. 1. Fig. 25 is a view in longitudinal sectional elevation, with certain parts omitted, of the mechanism shown in Fig. 24. Figure 26 is a face view of one of the ported rotatable disk members forming a part of the valve mechanism of Figs. 24 and 25, this disk being viewed from the line 26 on Fig. 25 and in the direction of the arrow. Figure 27 is a similar view of a ported stationary valve-disk cooperating with the valve disk 26, this disk being viewed from the line 27 on Fig. 25 and in the direction of the arrow. Figure 28 is a face view of another, movable, ported valve-disk cooperating with the valve-disk of Fig. 26, this disk being viewed at the line 28 on Fig. 25 and in the direction of the arrow. Figure 29 is a plan view of tone-arm-controlled valve-mechanism constituting one of the controlling elements of the pneumatic mechanism of the machine. Figure 30 is a view in side elevation of the mechanism of Fig. 29. Figure 31 is a view in end elevation of the mechanism of Fig. 29. Figure 32 is a plan view of a primary control box constituting a part of the pneumatic mechanism of the machine. Figure 33 is a plan view of the box of Fig. 32 with the cover portion removed and one end thereof shown in section. Figure 34 is a side view of the primary control box. Figure 35 is a section taken at the line 35 on Fig. 32 and viewed in the direction of the arrow. Figure 36 is an enlarged section taken at the line 36 on Fig. 32 and viewed in the direction of the arrow. Figure 37 is an enlarged sectional view taken at the line 37 on Fig. 32 and viewed in the direction of the arrow. Figure 38 is a plan view, with a portion thereof shown in section, of another valve mechanism constituting a part of the pneumatic mechanism of the machine and operable by the locking means for the rotatable record carrier. Figure 39 is a section taken at the line 39—39 on Fig. 38 and viewed in the direction of the arrows. Figure 40 is a rear face view of the sound-box and needle-holder. Figure 41 is an edge view thereof. Figure 42 is a broken view of the lower portion of the sound-box and needle-holder, a portion of the latter being shown in section. Figure 43 is a bottom plan view of the needle-holder. Figure 44 is a view in the nature of a diagram showing the various pipe lines, pneumatics and valve devices constituting the pneumatic control mechanism for the machine; Fig. 45 is a plan view of a part of the mechanism for actuating the needle holder; and Figure 46, a view in elevation of the mechanism for releasably holding the tone arm in normal position.

The machine shown comprises a cabinet 50 for housing the various operating parts of the mechanism hereinafter described, the cabinet being provided adjacent its upper end with a horizontal partition 51 dividing the cabinet into upper and lower compartments 52 and 53, respectively, the partition 51 containing an opening 54 therein in registration with which the record to be played extends.

In the particular illustrated embodiment of our invention the records to be played and represented at X are rotatably supported upon a rotatable record-carrying mechanism which is movable to position for playing any of the records as desired. This carrying mechanism comprises a shaft 55 journalled at its ends in bearings 56 and 57 supported on a rigid frame work 58 located in the casing 50 and firmly secured to the bottom thereof. The shaft 55 has rigidly secured thereto a disk 59 provided at a face thereof with radiating rotatable spindles 60 the outer ends of which are equipped with friction disks 61 and beyond these disks with record-supporting disks 62, the spindles 60 being continued outwardly beyond the disks 62 and the records X positioned thereon, and threaded to receive nuts 63 adapted to screw down against the outer faces of the records, through the central openings in which the spindles project. The spindles 60 are rotatably held to the disk 59 by bearings 64 and 65 through which they extend, the inner ends of the spindles being provided with collars 66 disposed at opposite sides of the bearings 65. The arrangement of the parts above described is such that the annular series of records are in line with the opening 54 in partition 51 and the uppermost horizontally-disposed record registers with this opening.

The mechanism for driving the uppermost horizontal record comprises a friction-disk 67 mounted on a shaft 68 journalled in bearings 69 (Fig. 3) carried by the frame 58, the driving disk 67 being located, as shown, in such position that it extends in frictional engagement with the underside of the friction disk 61 of the uppermost spindle 60 and normal to this disk and operates to drive the latter by frictional contact. The shaft 68 is driven by a motor 70, shown as an electric motor, through the medium of an endless belt 71 extending over a pulley 72 on the armature shaft of the motor and a pulley 73 rigid on a shaft 74 journalled in the frame 58, this shaft having fixed thereon a pulley 75 connected, by a rubber belt 76, to a pulley 77 rigid on the shaft 68. Thus the shaft 68 is driven at all times during the operation of the motor 70.

The tone-arm of the machine is represented at 79, it being shown as formed of two sections 80 and 81 (Fig. 6). The section 80 is swiveled at 82, to swing in a horizontal plane, on a swiveling plate 83 secured to the upper surface of a rear, downwardly offset portion of the partition 51, the section 80 of the tone-arm opening downwardly into a tone passage 84 terminating in a sound-amplifying horn-portion 85 located in the upper compartment 52 of the casing. The outer section 81 of the tone-arm 79 is swiveled at its rear end, as indicated at 86, to rock vertically, on the outer end of the tone-arm section 80, the outer end of the tone-arm section 81 carrying, and opening into, a sound-box 87 of any desirable construction (Figs. 40–42) the stylus bar of the sound-box being represented at 88 and pivoted to the head as represented at 89 and provided at its lower end with a reproducing-needle for cooperation with the sound-producing grooves of the records X. The particular needle device shown comprises a holder 90 swiveled at 91 on the lower end of the lever 88, this holder being formed with radial arms 90ª containing a annular series of needle-receiving openings 92 shown as six in number, though the number thereof may be varied as desired, to receive the needles 93 which are held in place therein by set screws 94, the needle-holder cooperating with mechanism hereinafter described which operates automatically upon the return of the tone-arm and reproducer mechanism to normal position adjacent the outer edge of a record, to rotate the needle-holder 90 (one-sixth of a revolution) to position, for the next playing operation, the next succeeding needle, the needles thus being used in rotation and repeatedly until replacement thereof is necessary.

The normal position of the tone-arm and sound-box is that illustrated in the drawings in which position the tone-arm section 81 is tilted upwardly at its swivel connection 86 with the tone-arm section 80 and is held in this position by means of a rearwardly-extending arm 95 rigidly secured at its forward end to the tone-arm section 81 and having its rear extremity curved as represented at 95ª at which portion it extends beneath a rigid finger 96 extending forwardly from the movable side portion 97 of a bellows 98 normally held in the collapsed condition shown by a locking device 99 (Fig. 21) shown as in the form of a bell-crank lever fulcrumed at 100 to a stationary post 100ª. The lever 99 which co-operates with a spring 101 which normally tends to rotate the lever 99 in clockwise direction in Fig. 21 contains, in its upwardly-extending arm 102, a notch 103 adapted to engage over a pin 104 on the movable side 97 of the bellows 98 to releasably hold this bellows in collapsed condition.

Upon starting the machine into operation, as hereinafter described, the lever 99 is rocked to disengage from the pin 104, whereupon the bellows 98 expands and the movable side 97 thereof swings upwardly thereby permitting the sound-box 87 to lower to enter the needle in the beginning of the groove of the record X immediately beneath it, the engagement of the needle with the groove, in the rotation of the record causing the tone-arm 79 to swing at its swiveled portion 82 toward the center of the record. At the end of the record groove is an auxiliary groove represented at 105 into which the needle is guided to swing the tone-arm to a predetermined position after the record has been played.

The machine also comprises means for lifting the section 81 of the tone-arm and with it the sound-box 87 to raise the needle from the record and while these parts are in lifted position returning the tone-arm to the normal position shown in Fig. 6, these means comprising the bellows 98 which is collapsed to swing the tone-arm section 81 upwardly, as hereinafter described, and mechanism for swinging the tone-arm at its swivel 82 back to the normal position shown in Fig. 6 comprising an actuating rod 106 slidable in an opening in an arm 107 connected with, and projecting forwardly from, the tone-arm section 80 at the swivel 82. The rod 106 is provided with a block 108 which when this rod is shifted to the right in Fig. 6 engages the arm 107 to return it to the position shown therein. The rod 106 is actuated through the medium of a bellows 109, this rod being operatively connected with the movable side 110 of this bellows which latter is operated as hereinafter described through the medium of control valve mechanism represented generally at 111 (Figs. 29, 30 and 31) and controlled by an arm 112 secured to and radiating from the swivel portion 82 on the tone-arm section 80.

The machine also comprises means for releasably locking the tone-arm in the normal position shown in Fig. 6, these means comprising a latch 113 in the form of a bell-crank lever pivoted at its angle, as represented at 114, to a post 115 rising from the partition 51, one arm of this lever, and represented at 116, extending outwardly from this post and having a hook-portion 117 to form a stop with which the sound-box 87 interlocks, the other, depending, arm of this lever and represented at 118 normally engaging a stop 119 under the action of a spring 120 engaging the post 115 and the arm 116. It may be here stated that the latch is so positioned, as shown, that it extends into the path of movement of the sound-box 87 in the movement of the tone-arm 79, with the sound-box in raised position, to normal position, thereby releasably locking the tone-arm against swinging movement toward the center of the record. The disengagement of the sound-box 87 from the latch 113 is effected by the lowering of the sound-box to position the needle in the beginning of the record groove in a manner and by mechanism as hereinafter described.

The post 115 supports a horizontally slidable buffer-device hereinafter described which projects, under the action of a spring, into the path of movement of the box 87 in the swinging of the tone-arm at its swivel 82 to normal position, and yieldingly presses this head against the hook 117 of the latch 113.

The machine also comprises means for positively holding the rotatable record carrier in the position to which it is rotated by the mechanism hereinafter described, these means comprising a reciprocable rod 121 (Fig. 10) mounted in guides 122 and 123 on a stationary part of the machine, and adapted at its tapered end 121ᵃ to cooperate with openings 124 in the disk 59, the pin entering the one of these openings 124 registering therewith when the selected record is in position for playing. The other end of this rod is provided with a pair of collars 125 and 126 for cooperation, respectively, with a control-valve device 127 (Figs. 10, 38 and 39) hereinafter described. The rod 121 is also provided with a stop-device 128 between which and the bearing 123 a coil-spring 129, encircling the rod 121 and tending to force the rod 121 into the registering opening 124, is confined, the stop 128 cooperating with an arm 130 on the movable side 131 of a bellows device 132 which, when operated as hereinafter described, withdraws the rod 121 from the opening 124 in which it extends and releases the record-carrying mechanism for rotation, the bellows 132 being collapsed after the conclusion of the playing of a record and before the mechanism for automatically shifting the record-carrying mechanism, operates, and expanding to permit the rod 121 to shift to locking position immediately following the conclusion of the record-carrier shifting operation.

At the conclusion of each record-playing operation the needle-holder 90 is automatically rotated one-sixth of a revolution to present the next successive needle therein to the next record to be played, this operation being effected by a bell-crank lever 133 fulcrumed between its ends, as indicated at 133ᵃ, on a bracket 134 secured to the partition 51. The outer end of the arm 135 of this bell crank is provided with a pawl 136 pivoted thereon at 135ᵃ and yieldingly held in the position shown against a stop 135ᵇ by a spring 136ᵃ, the pawl 136 operating, when the bell-crank 133 is rocked counterclockwise in Figs. 4 and 6, to engage the adjacent one of the arms 90ᵃ of the holder 90 and rotate the latter one-sixth of a revolution, this pawl being adapted to yield, without disturbing the position of the holder 90, when the bell-crank rocks back to the normal position shown in Fig. 4. The other arm 137 of the bell crank 133 is pivotally connected at 138 with one end of a rod 139 the other end of which is provided with spaced stops 140 between which an arm 141 on the movable side 142 of a bellows device 143 extends. When the bellows 143 is collapsed, as hereinafter described, it operates to rock the bell-crank 133 in counterclockwise direction in Fig. 4 thereby to cause the next successive needle to move to a position in which it engages the beginning of the record groove beneath it upon the lowering of the reproducer head 87.

The machine is shown as equipped with a coin-controlled device (Figs. 14 and 15) by which the operation of the machine is controlled to automatically start the motor 70 upon the insertion of a coin into this mechanism and to automatically stop the machine upon concluding the playing of a record. This mechanism comprises an electric switch interposed in the electrical circuit of the motor 70 and formed of a stationary contact 144 and a rocking contact 145 pivoted at 146 on the casing 447 of this mechanism and adapted to be moved into and out of engagement with the contact 144, the terminal wires 147 and 148 of the electric circuit referred to being connected, respectively, with the contacts 144 and 145. Cooperating with the movable contact 145, which is connected with a spring 149 for moving this contact into engagement with the contact 144 unless movement of the contact 145 is restrained, is a latch 150 shown as in the form of a bell-crank lever pivoted at 151 to the casing 447. The upwardly extending arm 152 of this bell crank is provided with a shoulder 153 adapted to interlock with the adjacent end of the contact 145 and hold the latter out of engagement with the contact 144. The other arm 154 of this lever extends into the path of movement of coins dropped in the coin chute 155, a coin in dropping upon this end of the lever rocking it, against the resistance of a spring 156, in clockwise direction in Fig. 14 to a position in which the movable contact 145 is released for swinging movement, by the spring 149, into engagement with the contact 144 to close the motor circuit. Means are provided for rocking the contact 145 out of engagement with the contact 144 to break the motor circuit and thereby stop the motor 70 at the conclusion of the playing of a selection, these means comprising a bellows 157 operated by the mechanism, and as, hereinafter described, the movable side 158 of this bellows being connected with a link 159 slidable in an eye 160 on the movable contact 145 and provided beyond this eye with a head 161, the parts being so arranged that collapsing of the bellows 157 when the contact 145 is in engagement with the contact 144, raises the contact 145 to the position shown in Fig. 14 in which position it automatically interlocks with the latch 150 as shown thereby holding this switch device open.

The rotation of the record carrier to cause the desired one of the records to extend in playing position is effected through the medium of a clutch device shown more particularly in Figs. 11 and 12 and represented at 162 this device comprising the pulley 75 on the shaft 74 continuously driven from the motor 70 as hereinbefore described, and a friction disk member 163 journalled on, and slidable along, the shaft 74 toward and away from the pulley 75 and provided with a pulley-portion 164. The disk 163 is provided with friction-pads 165 adapted to engage a face of the pulley 75 and through which the friction member 163 is driven when held in engagement with the pulley 75. The mechanism now being described also comprises a pneumatic 166 operated as hereinafter described, the movable side 167 of which is provided with an arm 168 which, when the bellows 166 is collapsed, presses against the hub 169 of the friction-disk 163 and forces it along the shaft 74 into frictional engagement with the pulley 75. A belt 170 engaging the pulley 164 extends over a pulley 171 rigidly secured to the shaft 55 forming a part of the record-carrier. Thus so long as the friction clutch 162 is in driving condition, the rotatable record-carrier is rotated, but as soon as this clutch is disengaged, by the expansion of the bellows 166, the record carrier ceases to rotate. The collapsing of the bellows 166 is controlled in part through the medium of valve mechanism represented generally at 172 (Figs. 24 to 28, inclusive,) involving certain operating parts hereinafter described which are rotated when the clutch member 162 is in, by a sprocket chain 173 (Fig. 1) engaging a sprocket 174 rigid on the shaft 55 and a sprocket 175 forming a part of the valve mechanism 172.

The operation of the various mechanisms described to actuate the record carrier into a position for playing the records in succession or according to the manual selection by the operator of the machine; to raise the sound-box at the end of the playing of a record and return it while raised to normal position in which it extends adjacent the beginning of the record groove; the automatic shifting of the needle holder; and the automatic lowering of the sound-box to engage the needle with the beginning of the groove of the record to be played are all controlled by pneumatic mechanism which in turn is controlled by the coin controlled device of Figs. 14 and 15, a description of said pneumatic mechanism being as follows:

This mechanism comprises a suction pump represented more particularly in Figs. 11, 12 and 13 and shown as comprising four bellows devices 176 shown as mounted in a rectangular frame 177 secured to a stationary part of the machine. The frame 177 contains an endless passage 178 which opens through ports 179 in the stationary sides 180 of these bellows, into the interior of the latter, these ports being controlled by inwardly-opening flap-valves 181 therein. The movable sides of the bellows, represented at 182 and which contain openings 183 therethrough controlled by outwardly-opening flap-valves 184, are connected with arms 185 rigidly secured to and radiating from a head 186 journalled on a crank-portion 187 of the shaft 74. Thus as soon as the motor 70 begins to operate the bellows 176 are operated in succession to exert suction in the passage 178.

The passage 178 is connected with a pipe 188 which opens into a pipe 189 (Figs. 18 and 19) between the ends of the latter, one end of the pipe 189 opening into a primary control box represented at 190 (Figs. 32—35) and hereinafter described, and the other end of this pipe opening into a suction-regulating bellows device represented generally at 191 for controlling the amount of vacuum produced in the control box 190. The stationary side 196 of the bellows 191 contains a passage 192 communicating with the pipe 189 and opening into the interior of the bellows 191, the movable side 193 of which is normally held in extended position by a spring 194 connected at one end to the side 193 and at its opposite end to a bracket 195 secured to the stationary side portion 196 of these bellows. The movable side 193 contains a port 197 normally closed by a flap-valve 198 under the action of a spring 199. The stationary side portion 196 of the bellows 191 is provided with a pin 200 in alignment with the opening 197 and operating, when the suction exerted by the pump exceeds the resistance of the spring 194 and the movable side member 193 swings to the left in Fig. 19, to engage the flap-valve 198 and unseat the latter thereby reducing the degree of suction exerted in the pipe 189 to prevent it exceeding a predetermined amount, the valve device 198 being covered by a housing 201 open to the atmosphere and serving to protect this valve.

The primary control box 190 (Figs. 32, 33, 34 and 35) contains a chamber 202 the bottom of which comprises a flexible diaphragm 203 which extends across the tops of chambers 204, 205, 206, 207, 208 and 209, thereby separating all of these chambers from each other. The chamber 202 is a suction chamber and suction therein is maintained at all times during the operation of the motor 70 through the suction pipe 188.

The chamber 202 contains ports 210, 211, 212, and 213 in its upper wall which open into chambers 214, 215, 216 and 217, respectively, which in turn open to the atmosphere through ports 218, 219, 220 and 221, respectively. The chambers 214 to 217, inclusive, contain valve devices 222, 223, 224 and 225 which serve, when in the normal position shown in Fig. 35, to close the suction chamber 202 to all of the chambers 214 to 217, inclusive, and when raised, as hereinafter described, to open the chambers 214 to 217, inclusive, to the suction chamber 202 and close these first-referred-to chambers to the atmosphere. The valve devices 222 to 225, inclusive, are of the same construction, their depending stems 226 extending downwardly into the suction chamber 202 and being provided at their lower ends with plate portions 227 vertically alined with the respective chambers 204, 205, 206 and 207, and at which they engage the diaphragm 203 directly beneath them.

The primary control box 190 also contains chambers 228 and 229 communicating with the suction chamber 202 through ports 230 and 231, respectively. The port 230 is arranged immediately above the chamber 209 and is in communication with a port 232 opening to the atmosphere and controlled by a reciprocable valve 233, the stem 234 of which extends downwardly in the port 230 and directly above a valve block 235 carried by the diaphragm 203 where it extends across the top of the chamber 209, the valve 233 being normally closed. The port 231 communicates with a port 236 communicating with the atmosphere and controlled by a valve 237 the stem 238 of which extends downwardly in the port 231 and in alignment with a valve block 239 carried by the portion of the diaphragm 203 which extends across the top of the chamber 204, the normal position of the valve 237 being closed.

Located below the suction chamber 228 is a chamber 240 over which a portion of the diaphragm 203 extends, the chamber 228 communicating by a port 241 with a chamber 242 open to the atmosphere through a port 243. The control of the chamber 242 to the atmosphere and to the chamber 228 is controlled by a valve device 244 operating in the chamber 242, the depending stem of this valve device having a plate portion 246 bearing against the diaphragm 203 below it.

Located below the chamber 229 are two chambers 247 and 248 over which a portion of the diaphragm 203 extends. The chamber 229 communicates, through ports 249 and 250, with chambers 251 and 252, respectively, which communicate with the atmosphere through ports 253 and 254, respectively, the communication of the chambers 251 and 252 with the chamber 229 and the atmosphere being controlled by separate valves 255 and 256, respectively, the lower stems 257 of which are provided with plates 258 which bear against the diaphragm 203 immediately beneath them.

The chambers 204, 205, 206, 207, 208, 209, 240, 247 and 248 communicate with pipes 259, 260, 261, 262, 263, 264, 265, 266 and 267, all of which serve to permit air from the atmosphere and under control as hereinafter described, to enter these respective chambers to thereby effect control of the respective valves hereinbefore described and cooperating with the diaphragm 203 extending across these chambers, pipe 260 (Fig. 44) opening into pipe 263, and pipe 262 opening into pipe 261. The chambers 214, 215, 216, 217, 242, 251 and 252 open into pipes 268, 269, 270, 271, 272, 273 and 274, all of these pipes being suction pipes in which suction is produced under the control of the described valves controlling communication between these chambers and the suction chambers of the box 190 and controlled by the admission selectively of the atmosphere into the chambers below the diaphragm 203.

It may be here stated that so long as the pipes 259 to 267, inclusive, are closed to the atmosphere, all of the valves of the primary control box 190 will be in the normal position shown in Fig. 35 in which the chamber 202 is in communication with the chambers 228 and 229, and all of the chambers 214, 215, 216, 217, 242, 251 and 252 are closed to the chambers 202, 228 and 229, but as soon as any one of the chambers separated from the chambers 202, 228 and 229 by the diaphragm 203, is opened to the atmosphere the particular one of the valves controlled by the portion of the diaphragm over the one of the lower chambers in communication with the atmosphere, is operated out of normal position. The opening of the pipe 264 to the atmosphere will cause the valve 234 to close the chamber 228 to the chamber 202 and open the chamber 228 to the atmosphere by unseating the valve 233; the opening of the chamber 204 to the atmosphere through the pipe 259 will cause the valve 239 to close the chamber 202 to the chamber 229 and open the valve 237 for communicating the chamber 229 with the atmosphere; and the opening of any one of the pipes communicating with the remaining diaphragm-covered chambers of the box 190 will result in the suction above the diaphragm raising the one of the valves which cooperates with this particular diaphragm-covered chamber to close to the atmosphere the chamber controlled by this valve and open it to the suction chamber of the control box 190 for producing suction in the pipe leading from such valve-controlled chamber. Each of the chambers 204, 205, 206, 207, 208 and 209 are in restricted communication with the chamber 202 and the chambers 240 and 247 and 248 are in restricted communication with the chambers 228 and 229, respectively, by bleed-openings as shown in Figs. 36 and 37 of the chambers 247 and 204. In these two figures the bleed-opening is represented at 275 and is shown as formed in the bottom of a cup 276 mounted in a passage opening into these two chambers to be controlled by the bleed-opening. The primary purpose of these bleed-openings is to permit of the exhausting of the air in the diaphragm-controlled chambers, at the proper speed following the closing of these chambers to the atmosphere in the operation of the machine.

Referring now more particularly to the pneumatic mechanism by which the records are caused to be played in succession or, under the control of the operator, selectively, the pipe 264 connects with a pipe 277 which opens into a continuous annular groove 278 provided in a face of a stationary valve disk 279 forming a part of the valve mechanism 172 hereinbefore referred to, and shown as mounted on a sleeve 280 rotatable in the disk 279 and surrounding, and rigid with, a rotatable shaft 281 journalled in a bracket 282 secured to the partition 51, the outer end of the shaft 281 extending forwardly to a point accessible for rotation by the operator and being provided with a turning knob 283 having a pointer 284 which in practice would be used to indicate by its angular position the record which the machine will next play. The valve disk 279 is held against rotation on the sleeve 280 by a pin 285 engaging a clip 286 on the bracket 282 and is yieldingly pressed to the right in Fig. 24 by a coil-spring 287 surrounding the sleeve 280 and confined between the disk 279 and a collar 288 rigid on this sleeve. The disk 279 also contains an annular groove 289 arranged concentric with the groove 278 and opening into a pipe 290 which communicates with the pipe 267 between the ends of the latter. The disk 279 is pressed by the spring 287 against a face of a disk 291 shown as formed integrally with the sleeve 280, the disk 291 containing openings 292 and 293 therethrough in registration, respectively, with the grooves 278 and 289 in the disk 279, the disk 291 being provided with a pin 294 extending lengthwise of the axis of the shaft 281. The disk 291 contains about its periphery a series of notches 295 corresponding in number with the number of records supported on the record carrier and adapted to engage with a spring-pawl 296 carried by the bracket 282.

Bearing against the face of the disk 291 opposite that engaged by the disk 279 and rotatably and slidably mounted on a sleeve 297 rotatable on the shaft 281, is a third valve disk 298 to which the sprocket 175 is connected by a pin 175ª and relative to which the disk 298 is slidable, this disk being yieldingly forced against the adjacent face of the valve disk 291 by a coil spring 299 confined between the sprocket 175 and the disk 298. The valve disk 298 contains in a face thereof concentric arc-shaped grooves 299 and 300 arranged to register, respectively, with the openings 292 and 293 in the valve disk 291, except when the solid portion 301 (Fig. 28) of the disk 298 is in registration with the openings 292 and 293, the grooves 299 and 300 opening to the atmosphere through openings 302 and 303 in the disk 298. The disk 298 is provided with a radially extending pin 304 which is positioned to extend into intersecting engagement with the pin 294 when the solid portion 301 of the disk 298 registers with the openings 292 and 293.

It will be understood from the foregoing that so long as the parts of this valve mechanism 172 are in a position in which the solid portion 301 of the valve disk 298, is out of registration with the openings 292 and 293 in the disk 291 both pipes 277 and 290 will be open to the atmosphere through the openings 292 and 293 in disk 291, and the grooves 299 and 300 and openings 302 and 303 in the disk 298; but as soon as the solid portion 301 of the disk 298 registers with the openings 292 and 293, both of the pipes 277 and 290 will be closed to the atmosphere.

The pipe 267 and the pipe 261 (the pipe 267 being connected with the pipe 290) lead to the control valve device 111 shown in detail in Figs. 29, 30 and 31, and open through a face of a block 305 thereof. This block has pivoted thereto a flap valve 306 which is provided with a spring 306ª which holds the valve 306 in a position for closing the open ends of the pipes 261 and 267 to the atmosphere except when this valve is opened as hereinafter described. This valve device also comprises means for actuating the valve 306 responsive to the swinging movement of the tone-arm 79 these means comprising levers 307 and 308, the lever 307 being pivotally supported at its lower end, as represented at 309, to the block 305 and provided at its upper end with an adjustable tappet screw 310. The lever 308 is of bell-crank form and is fulcrumed, as indicated at 311, to the block 305. One arm 312 of the lever 308 extends upwardly and is provided with an adjustable tappet-screw 313. The other arm 314 of this lever extends toward the lever 307 and is provided at its extremity with a laterally-extending, horizontally-disposed, pin 315 which passes freely through an opening 316 in the block 305 and overlies the outer end of the flap-valve 306. A coil-spring 317 is connected at its opposite ends, as indicated at 318 and 319, to the lever 307 and the lever-arm 312, respectively, above the pivots 309 and 311 and tends to rock the lever 307 in counterclockwise direction in Fig. 30 and the lever 308 in clockwise direction in this figure. The lever 307 operates as a latch for the lever 308 and to this end is provided with a shoulder 320 with which the outer extremity of the arm 314 is adapted to interlock as shown in Fig. 30, the lever 307 also being provided with a stop-shoulder 321 adapted to co-act with the lever-arm 314.

The valve device 111 is positioned as shown particularly in Fig. 6, to cause the tappet-devices 310 and 313 to be located at the ends of the path traversed by the arm 112 in the oscillations of the tone-arm 79 about the swivel 82. In the movement of the tone-arm 79 to the normal position shown in Fig. 6, the arm 112 strikes the tappet 313 thereby rocking the lever 308 in counterclockwise direction in Fig. 30 which removes the pin 315 from engagement with the flap-valve 306 thereby permitting the latter to close the open ends of the pipes 267 and 261, the lever 308 becoming latched in the position just referred to by its engagement with the notch 320 of the lever 307 as shown in Fig. 30. Thus the pipes 267 and 261 are normally closed. When the tone-arm 79 nears the end of its swing movement toward the center of the record, the arm 112 on the tone-arm 79 engages the tappet 310 and rocks the lever 307 in clockwise direction in Fig. 30 which causes the latter to disengage from the lever 308 and permit the spring 317 to rock the lever 308 in clockwise direction in Fig. 30 to a position in which the flap-valve 306 is moved downwardly to a position in which the pipes 267 and 261 are both open to the atmosphere.

The pipes 259 and 264 connect with the stationary side member 322 (Figs. 20, 21 and 44), of the bellows device 98 and open separately through a face of this side and their communication with the atmosphere is controlled by a pivoted flap-valve device 323 normally held in a position to close the open ends of the pipes 259 and 264, by a spring 324. The valve device 323 is controlled by an arm 325 carried by the movable side 97 of the bellows 98. When the bellows 98 are in collapsed condition in which the sound-box is in raised position, and the needle is clear of the record, the arm 325 is clear of the valve 323 and the latter is closed, but when the bellows 98 are expanded the arm 325 engages and opens the valve device 323 thereby opening the pipes 259, 277 and 264 to the atmosphere.

The bellows 98 are controlled by suction in the pipe 269 opening into the interior of these bellows. Interposed in the pipe 269 is a bleed-valve 269* (Figs. 22, 23 and 44). This bleed-valve is formed of a casing 326 containing a chamber 327 in communication with that portion of the pipe 269 which leads from this bleed-valve to the primary control box 190. The casing 326 also contains a passage 328 which communicates with the portion of the pipe 269 which leads from this bleed-device to bellows 98. Located in the chamber 327 and extending over the end of the passage 328 is a flap-valve 329 which opens away from the passage 328 and contains an opening 330 in registration with this passage. The flap-valve 329 is provided with a cup 331 arranged in line with the opening 330 and containing a very small bleed-opening 332. It may be here stated that this bleed-valve is so constructed, and arranged, as shown, that when suction is exerted in the chamber 215 of the primary control box 190, it does not present any restriction to the suction action, but permits the bellows 98, assuming that they are expanded, to be quickly collapsed. However, when the valve device 222 in chamber 214 of the primary control box 190 is returned to the normal position shown in Fig. 35 which opens the chamber 214 to the atmosphere, the passage of air from the atmosphere to the bellows 98 is retarded by the bleed-valve 269* thereby causing the bellows 98 to expand relatively slowly which is highly desirable inasmuch as the expanding of the bellows 98 controls the lowering of the needle onto the record.

The bellows 166 controlling the clutch which in turn controls the driving of the record-carrier from the shaft 187, are connected with the pipe 273; the bellows 131 which controls the lock for the record carrier is connected with the pipe 274; the bellows 109 with the pipe 270; and the needle-shifting bellows 142 with the pipe 268.

The pipe 272 communicates with a bellows 333 the movable side 334 of which is caused to be expanded by a spring 335 and is provided with a finger 336 which extends over the arm 99* of the lever 99 and is so positioned that when the bellows 333 is collapsed the finger 336 rocks the bell-crank lever 99 to a position in which its shoulder 103 disengages from the pin 104 of the bellows 98.

The bellows 157 are connected with the pipe 271; and a pipe 337, connected with the pipe 264 between the control box 190 and the pipe 277, and opens through a block 338 (Figs. 14, 15 and 44) and thus to the atmosphere, under the control of a pivoted safety valve-device 339 (Fig. 14) normally pressed to close the pipe 337 by a spring 340 and extending at a finger 341 thereon into the path of movement of the switch member 145 controlling the motor circuit, these parts being so arranged, as shown, that when the motor-switch is open the valve 339 is open and when the motor switch closes to operate the motor, the valve device 339 closes and closes the pipe 337 to the atmosphere.

The pneumatic mechanism described also comprises the duplex valve device 127 (Figs. 10, 38 and 39) formed of a casing 342 containing separate passages 343 and 344 which communicate, respectively, with the pipes 265 and 266. The casing 324 contains pivoted flap-valves 345 and 346 adapted, respectively, to close and open the passages 343 and 344 to the atmosphere, these valves being normally pressed to closed position by springs 347 and 348, respectively. The ends of the valves 345 and 346 extend beyond the casing 342 and into the paths of movement of the collars 125 and 126, respectively, (Fig. 10). In the normal position of the machine the valve 345 is held open by the collar 125 and the valve 346 is closed. When the locking pin 121 is withdrawn from locking engagement with the record carrier, against the resistance of the spring 129 by the collapsing of the bellows 131, the collar 125 disengages from the valve device 345 and the collar 126 engages the valve device 346 thereby opening the pipe 266 to the atmosphere and closing the pipe 265. When the rod 121 again moves to locking position, under the action of the spring 129, the collars 125 and 126 move to a position in which the valve 346 closes and the valve 345 opens (Figs. 10 and 38).

The pneumatic mechanism further comprises a valve device 349 (Figs. 6 and 44) comprising a block 350, through a face of which the pipe 263 opens, and a flap-valve 351 normally pressed to close the pipe 263, by a spring 352. The outer end of the flap-valve 351 extends into the path of movement of a pawl 353 pivoted at 354 on an angle-shaped arm 355 carried by the movable side 110 of the bellows 109. The pawl 353 is engaged by a spring 356 which tends to normally hold the pawl 353 in engagement with a pin 357 on the arm 355, but permits of clockwise rotation of the pawl 353 in Fig. 6. The parts just described are so arranged, as shown, that when the bellows 109 is collapsed to shift the tone-arm 79 to the position shown in Fig. 6, the pawl 353 will idle past the valve 351, but when the bellows 109 is expanded to return it to the normal position shown in Fig. 6 the pawl 353 will operatively engage the valve 351 causing the latter to momentarily open, the pawl 353 thereupon moving to the position shown in Fig. 6, in which it is disengaged from the valve 351, in the final movement of the bellows 109 to expanded position.

The normal positions of the several parts of the machine are those illustrated in the drawings in which the tone-arm 79 is swung to a position in which the needle positioned for use by the needle-shifting mechanism extends directly over the beginning of the record-groove at the outer edge of the record and the section 81 of the tone-arm and the sound-box are raised to hold the needle clear of the record, the sound-box being held in raised position by the engagement of the arm 95 with the pin 96 on the bellows 98 which latter are in collapsed condition and so held by the engagement of the latch 99 with the pin 103 (Fig. 21).

In the normal position of the machine the locking pin 121 is interlocked with the disk 59 of the record carrier, the bellows 131 being in expanded condition. The bellows 109, 142, 166, 333 and 157 are also in expanded condition as all are in communication with the atmosphere; the valve device 111, controlling the pipes 267 and 261 and also pipe 262, is closed and the actuating lever 308 therefor is locked in the position in which this valve remains closed until lever 308 is released; the valve 323 (Fig. 21) is closed and thus pipes 259 and 264 are closed to the atmosphere at this valve device; the valve 351 is closed thereby closing the pipe 265; the valve 345 is open which opens pipe 265 to the atmosphere and the valve 346 is closed, and assuming that the operator, before the completion of the playing of the last selection did not turn shaft 281 to select a record, the ends of the pipes 277 and 290 at which they open into the valve mechanism 172 are closed by the latter.

The operation of the machine is as follows:
The dropping of a coin into the chute 155 of the coin controlled mechanism (Fig. 14) trips the lever 150 and releases the switch lever 145 which swings into engagement with the fixed contact 144 thereby closing the motor circuit and permitting the valve 339 to close. The motor 70 thereupon operates rotating the shaft 74 and, through the medium of the belt 76, drives the shaft 68 and the record-rotating drive-disk 67 and also starts the suction-pump mechanism into operation. The vacuum thereby produced is exerted in the chambers 202, 228 and 229 of the primary control box 190, above the diaphragm 203. As the valve 345 is open and the pipe 265 is thus in communication with the atmosphere, the valve 244 of the primary control box immediately rises closing the pipe 272 to the atmosphere and connecting it with the suction chamber 228 whereupon the bellows 333 immediately collapse thereby causing the latch 99 (Fig. 21) to disengage from the pin 103 of bellows 98. As the bellows 98, controlled by this latch device, is in communication with the atmosphere through the pipe 269 and bleed-device 269$^a$ (the valve 223 controlling this pipe being in the depressed position shown in Fig. 35), air from the atmosphere is permitted to enter pipe 269, slowly passing through the bleed-device 269$^a$ and into the bellows 98 which, being spring-expanded, gradually expands. As the bellows 98 expands the arm 96 on tone-arm 79 and controlled by these bellows gradually rises, permitting the sound-box, together with the tone-arm section 81 to swing downwardly at the swivel connection of the latter with the tone-arm section 80 and lower the needle upon the record groove at the beginning of the latter. The motor, in continuing its operation, operates, by the engagement of the needle with the record groove, to cause the needle to follow the groove and play the selection, the tone-arm 79 gradually swinging at its swivel connection 82 with the partition 51 toward the center of the record groove. The needle upon completion of the playing of the record enters the portion 105 of the spiral record groove thereby continuing the swinging of the tone-arm 79 inwardly to a position in which the arm 112 thereon engages and actuates, to the right in Fig. 30, the latch-lever 307 thereby releasing the lever 308 for clockwise movement in this figure under the action of the spring 317 which results in the opening of the valve 306 which opens pipes 267, 261 and 262 to the atmosphere, thereby causing the suction in the primary control box to lift valves 256, 222 and 223 which closes the pipes 274, 269 and 270 to the atmosphere and connects them with the suction in the primary control box with the result of collapsing the disk-lock-release bellows 131, the tone-arm return bellows 109, and the tone-arm lifter bellows 98, the pipe 270 which controls the tone-arm-return bellows 109 containing preferably a restriction 270ª (Fig. 7) to ensure sufficient delay in the collapsing of the bellows 109 as not to start to return the tone-arm to normal position at the outer edge of the record until the tone-arm-lifter bellows 98 has lifted the needle clear of the record.

The collapsing of the bellows 131 operates to withdraw the locking rod 121 from engagement with the disk 59 against the action of the spring 129, the collars 125 and 126 moving to a position in which the valve 345 closes and the valve 346 opens.

The collapsing of the bellows 98 swings the tone-arm section 81 and the sound-box upwardly to lift the needle clear of the record, and the subsequent collapsing of the tone-arm-return bellows 109 causes the tappet 108 on the rod 106 (Fig. 6) to engage the arm 107 on the tone-arm 79 and swing the latter away from the center of the record to the normal position illustrated in this figure. In the final outward movement of the tone-arm 79 the arm 112 engages the bell crank lever 308 of the valve device 111 (Fig. 30) returning it to the normal position shown in this figure in which it becomes locked by the latch lever 107, the valve 306 in this movement automatically moving to closed position.

When the valve 306 moves to closed position as stated it closes the pipes 267, 261 and 262 to the atmosphere with the result that the valves 256, 222 and 223 drop to the normal position shown in Fig. 35 thereby opening the pipes 274, 269 and 270 to the atmosphere and the bellows 131 and 109 thereupon expand. While the pipe 269 is thus opened to the atmosphere the bellows 98 does not expand as it becomes automatically locked in collapsed condition by the lock 99 in the previously described actuation of these bellows to lift the needle from the record at the end of the record groove.

As the bellows 109 reaches the end of its expanding movement the engagement of the pawl 354 (Fig. 6) with the valve 351 momentarily opens this valve thereby opening the pipes 263 and 260 to the atmosphere which results in the valves 222 and 225 rising to close the pipes 268 and 271 to the atmosphere and open them to the suction in the primary control box, thereby causing the needle-shifter bellows 142 and the bellows 157 to collapse. The collapsing of the bellows 142 operates to actuate the pawl-equipped lever device 133 and rotate the needle holder one-sixth of a revolution to present the next succeeding needle in a position to enter the record-groove at the beginning thereof when the sound-box is again lowered. The collapsing of the bellows 157 lifts the movable switch-device 145 out of engagement with the contact 144 and breaks the circuit to motor 70 which thereupon ceases to rotate, the lever 145 becoming automatically locked in open position by the coin-actuated lever 150. In the movement of the lever 145 as stated the valve 341 (Fig. 14) is forced to open position.

As the valve 351 is opened momentarily only, as stated, the bellows 142 and 157 become quickly restored to expanded condition.

The opening of the valve 346 by the withdrawal of the disk-locking rod 121, opens the pipe 266 to the atmosphere with the result that the valve 255 (Fig. 35) rises closing the pipe 273 to the atmosphere and opening it to the suction in the primary control box which collapses the bellows 166 thereby clutching the driving-disk 163 to the belt-pulley 75 which is in driving relation to the shaft 55 of the record carrier. The record-carrier mechanism thereupon immediately begins to rotate in clockwise direction in Fig. 1 rotating the valve disk 298 in the same direction. If the operator has not turned the shaft 281 by hand to select a record the disk-locking rod 121 automatically enters one of the openings 124 in the disk 59 as soon as the one of the records next in the rear of the record just played, namely, the one of the records immediately to the left in Fig. 1 of the record which has been played, is moved by the record carrier to horizontal position at the upper portion of the carrier.

The shifting of the rod 121 to locking position causes the valve 346 to close and the valve 345 to open, pipe 266 thus becoming closed to the atmosphere which results in communication being established between the pipe 273 and the atmosphere whereupon the bellows 166 immediately expand whereupon the drive-shaft 74 disengages from the drive pulley 164 and rotation of the rotatable record-carrier ceases. The machine is thus conditioned for playing, in the next operation thereof, by the dropping of another coin into the coin-controlled mechanism, the next record succeeding the one previously played.

The bellows 98 (Figs. 20 and 21) in expanding and permitting the needle to lower onto the record at the beginning of the record-groove, cause the arm 325 of these bellows to engage with, and open, the valve 323 which opens pipes 264 and 259 to the atmosphere with the result that the valves 239 and 238 rise which closes the chamber 229 to the suction chamber 202 and opens this chamber 229 to the atmosphere thereby positively preventing the operation of the disk-lock-release bellows 131 and the record-carrier-clutch bellows 166 and consequently preventing movement of the rod 121 out of locking position and the clutching of the drive shaft 74 to the record-carrier, until the sound-box has again been raised, at the conclusion of the playing of the record, to lift the needle clear of the record.

The valve device 338 is provided as a safety feature to prevent accidental operation of the bellows 333 by such suction as may remain in the primary control box after the current to the motor is shut off, to a position in which the needle engages the record. As the valve 339 opens in the operation of breaking the motor circuit, it opens the chamber 209 to the atmosphere whereupon the valves 235 and 233 rise closing the passage 230 to the suction-chamber 202 and opening the passage 230 to the atmosphere, thereby preventing any residual suction, due to the momentum of the motor, after the motor circuit is broken, from exerting suction action in the bellows 333, it being noted that valve 345 is open when the motor circuit is broken. As the valve 339 closes simultaneously with the closing of the motor circuit it does not interfere with the proper operation of the bellows 333 as hereinbefore described.

It may be here stated that unless the operator manually operates the shaft 281 for selecting a particular record, the valve device 172 performs no function in the automatic control of the machine, the solid portion 301 of the valve disk 298 remaining opposite the ports 292 and 293 in the valve disk 291 and maintaining the pipes 277 and 290 closed to the atmosphere at all times, it being understood that the valve disks 291 and 298 rotate together, in the rotation of disk 298 from the sprocket 175 driven simultaneously with the record-carrier, by reason of the pin connection 175ᵃ between the sprocket 175 and the disk 298.

Referring now to the operation of the machine under selective control by the operator for playing any one of the records carried by the record-carrier, such selective control is effected by the manual rotatable setting of the valve disk 291 relative to the valve disks 279 and 298, such setting causing the openings 292 and 293 in the disk 291 to be moved out of registration with the solid portion 301 of the disk 298 and into registration, respectively, with the non-continuous grooves 299 and 300 in the disk 298 thereby opening both of the pipes 277 and 290 to the atmosphere.

The manual adjustment of the disk 291 may take place, to effect the desired record-selecting action, either during the playing of a record or, assuming the machine to be in non-operating position, before another coin is dropped into the coin-controlled mechanism (Figs. 14 and 15).

As the pipe 277 is open to the pipe 264 the latter is thus open to the atmosphere through the selective valve mechanism 172 so that as soon as the motor begins to operate and produce suction in the primary control box, the valves 235 and 233 of the latter are caused to rise the valve 235 closing the suction chamber 228 to the suction chamber 202 and the valve 233 opening the chamber 228 to the atmosphere which renders of no effect the open condition of pipe 265 of the tone-arm release bellows through the open valve 345 so that the bellows 333 remains expanded until the pipe 277 is closed at the valve device 172.

As the pipe 290 is connected with the pipe 267 the starting of the motor into operation which produces suction in the primary control box, causes the valve 256 to rise thereby producing suction in the pipe 274 which collapses the disk-lock-release bellows 131 thus withdrawing the locking rod 121 from engagement with the disk 59. The shifting of the rod 121 as stated permits the valve 345 to close and causes the valve 346 to open, whereupon suction is exerted in the pipe 273 to collapse the bellows 166 which operates to effect rotation of the shaft 55 and consequently rotation of the record-supporting parts carried thereby which rotates the record-carrier.

The bellows 166 remain collapsed and the record-carrier continues to rotate, until the solid portion 301 of the valve disk 298, in its rotation simultaneously with the record-carrier, moves into registration with the openings 292 and 293 in the valve disk 291, the extent of rotation of the rotatable record-carrier thus depending upon the angular position to which the operator adjusted the valve disk 291 in the selecting operation, it being noted that the provision of the spring finger 296 and the notches 295 in the valve member 291 ensures the setting of the disk 291 in any one of six different positions to in turn ensure the stopping of the record carrier with the selected record to be played extending in horizontal position.

When the valve disk 298 is rotating with the record-carrier moves to a position in which its solid portion 301 registers with the openings 292 and 293, the pipes 277 and 290 become closed to the atmosphere. The passage 230 of the primary control box being open to the atmosphere while pipe 277 is open to the atmosphere, by reason of the open condition of the valve 233, pressure in the passage 230 and in chamber 209 becomes equalized through the bleed opening 275 of this part of the valve structure, whereupon the valves 235 and 233 lower and close the chamber 228 to the atmosphere and open it to the suction in chamber 202. The valve 345 being open at this time, as the disk-locking rod 121 is in locking position, the pipe 265 is open to the atmosphere and thus the valve 244 immediately shifts to cause the tone-arm-release bellows 333 to communicate with suction-chamber 228 whereupon these bellows collapse and release the bellows 98 for expansion and resultant lowering of the needle onto the record.

It will thus be understood that when the selector valve device 172 is set manually for selecting a record, the operation of the tone-arm-release bellows 333 is automatically delayed until the rotatable record-carrier has come to rest with the selected record in proper position to receive the needle.

While the machine is shown as operated through the medium of a so-called single-coin-controlled device requiring that the coin for the next play be inserted after the conclusion of the playing of the record then being played and after the switch 145 is opened, it is equally adapted for use with so-called multiple-coin-controlled devices wherein the machine automatically plays a number of selections corresponding with the number of coins dropped, in quick succession, into the coin-controlled device, such multiple-coin controlled devices being well known in the art and in common use and involving means whereby the switch is not locked in open position until the completion of the last play of the number thereof paid for by the coins. With such a control device, the switch lever 145 upon movement to the position shown in Fig. 14 by the collapsing of the bellows 157, would immediately return to closed position following the momentary opening of the valve device 349, and the operation of the apparatus would be the same as that above described following the introduction of a coin into the chute 155; the machine repeating its cycle of operations until the switch lever 145 is swung to, and locked in, switch-opening position.

Attention may also be directed to certain details of the machine which are not above described. One of these features relates to a tubing-block for permanent connection inside of the casing 50 to expedite the proper reconnection of the several pipes of the pneumatic system in the event of the necessity of removing from the casing the various mechanisms carried by the removable partitions 51. In this connection it may be stated that the various pipes of the pneumatic mechanism described are preferably formed of flexible hose lines which are telescoped at their ends with rigid pipe stubs. The tubing block shown is represented generally at 358 (Fig. 16) and is formed of upper and lower bar sections 359 and 360 the section 360 being secured to the casing of the underside and the upper section 359 to lower section 360 by screws 361, with an intervening gasket strip 362. This block contains a plurality of angular passages 363 terminating at their opposite ends in rigid pipe-stubs 364 and 365 all of these pipe stubs in this detailed showing of the tubing-block being given the same designating numerals. These pipe-stubs thus serve as means for connection therewith of the flexible tubes of the pipe lines, and when it is desired to remove the mechanisms carried by the partition 51, the only disconnection necessary to be made is to separate the upper section 359 from the lower section 360. The desired connections between these tubes may again be made by re-applying the block-section 359 to the block section 360.

The other details which may be mentioned are the spring buffer device for cooperation with the sound-box and shown in Figs. 6 and 8; and the speed-controller device for regulating the speed of rotation of the record, shown in Figs. 9 and 10.

The buffer device referred to comprises a bar 366 slidably mounted in the post 115 for abutment at its head 367 with the sound-box 87 in the movement of the latter to the position shown in Fig. 6. A coil spring 368 surrounding the bar 366 and confined between the head 367 and the post 115 serves to yieldingly press the bar 366 to the left in Fig. 6 and normally hold it in engagement at its flange 369 with the post 115. As the sound-box swings to the position stated this buffer device cushions the head and then yieldingly presses it against the locking shoulder 117 of the lever 113, but not with a pressure sufficient to prevent the sound-box from lowering when the bellows 98 expand.

The speed-controlling mechanism referred to not only operates as a means for controlling the speed at which the record rotates, but also, in conjunction with the rubber belt 76, as a means for rotating the record at a uniform speed, regardless of fluctuations in the speed of the motor 70. This mechanism comprises a shaft 370 journalled in a stationary bracket 371 and provided with a worm 372 meshing with a worm wheel 373 fixed on the shaft 68. The shaft 370 is provided with a friction disk 374 slidable lengthwise thereon and connected with the free ends of leaf springs 375 held at their opposite ends against movement lengthwise of the shaft and weighted between their ends as indicated at 376. The device just referred to operates on the principle of a centrifugal governor, the disk 374 being shifted to the right in Fig. 9 as the speed of rotation of the shaft 370 is increased and shifting to the left in this figure as the speed of rotation is reduced. The friction disk 374 cooperates with a relatively stationary friction member 377, which may be a block of felt shown as supported in one arm 378 of a yoke member 379 pivoted on a pin 380 projecting laterally from the bracket 371, this yoke being held against displacement on the pin 380 by a collar 381 fixed on this pin between the arms of the yoke. The other arm 382 of this yoke extends, at an angular extension 383 thereof, into the path of movement of the lower end of an adjusting screw 384 threaded in a stationary bracket 385. Thus the friction member 377 is adjustable toward and away from the friction disk 375 to vary the speed at which the records are rotated.

It has been found in practice that by driving the shaft, which is controlled by the centrifugal regulator described, through the medium of a rubber belt, which presents a resilient or yieldable driving connection, the record disk is driven at a uniform speed as compared with the non-uniform speed at which an electric motor operates which, it will be understood, is of considerable importance as fluctuations in the speed at which the record is driven results in corresponding variations in pitch or tone of the sound produced in the playing of the record.

While we have illustrated and described a particular construction embodying our invention, we do not wish to be understood as intending to limit it thereto as the same may be variously modified and altered without departing from the spirit of the invention.

What we claim as new, and desire to secure by Letters Patent, is:

1. In a talking-machine, the combination of a plurality of record-supporting means, reproducer-means for cooperation with the records, and means for presenting different records in position to cooperate with said second-named means and comprising a drive member and a pneumatically controlled clutch controlling the driving of said first-named means by said drive member.

2. In a talking-machine, the combination of a plurality of record-supporting means, reproducer-means for cooperation with the records, means for presenting different records in position to cooperate with said second-named means and comprising pneumatically controlled means releasably locking said third-named means against actuation.

3. In a talking-machine, the combination of a plurality of record-supporting means, reproducer-means for cooperation with the records, means for presenting different records in position to cooperate with said second-named means and comprising pneumatically controlled mechanism, means releasably locking said third-named means against actuation, and pneumatically controlled means operating at the conclusion of the playing of a record for actuating said fourth-named means.

4. In a talking-machine, the combination of record-rotating means, a movable tone-arm provided with a reproducer device, means whereby said device is raised to clear the record and the tone-arm is swung to a position adjacent the beginning of the record-groove, means for starting the machine into operation, pneumatic means controlling the lowering of said device upon the record beneath it, and means controlled by the tone-arm in moving to the position stated for conditioning said third named means for lowering said device to the record upon the starting of the machine.

5. In a talking-machine, the combination of record-rotating means, a movable tone-arm provided with a reproducer device, pneumatic means for lifting said device clear of the record following the playing of the latter, means for locking said device in raised position, pneumatic means for moving said tone-arm to a position in which said device extends adjacent the beginning of the record-groove, valve-means controlled by the position of the tone-arm at the end of the playing of the record for effecting the actuation of said first and second-named pneumatic means to first lift said device clear of the record and then swing said tone-arm to a position adjacent the beginning of the record-groove, and means operating upon the starting of the machine, to actuate said third named means to release said device for lowering to the record.

6. In a talking-machine, the combination of record-rotating means, a movable tone-arm provided with a reproducer-device pivoted thereon to swing toward and away from the record, pneumatic means for rocking said device away from the record following the playing of the latter, means for locking said device in raised position, pneumatic means for moving said tone-arm to a position in which said device extends adjacent the beginning of the record-groove, means controlled by the position of the tone-arm at the end of the playing of the record for actuating said first and second-named pneumatic means to first lift said device clear of the record and then swing said tone-arm to a position adjacent the beginning of the record-groove, and means operating upon the starting of the machine, to actuate said third-named means to release said device for lowering to the record.

7. In a talking-machine, the combination of record-rotating means, and pneumatically-controlled means operating automatically to present to said record-rotating means a predetermined one of a plurality of records or, under selective control by the operator, any one of such records.

8. In a talking-machine, the combination of record-rotating means, and pneumatically-controlled means operating automatically to present to said record-rotating means a plurality of records in succession or, under selective control by the operator, any one of such records.

9. In a talking-machine, the combination of record-rotating means, and pneumatically-operated means for presenting records to said record-rotating means and comprising valve mechanism settable to determine the record to be presented to said record-rotating means.

10. In a talking-machine, the combination of record-rotating means, and pneumatically-controlled means for presenting records to said record-rotating means and comprising a driven element and valve mechanism manually settable to determine the record to be presented to said record-rotating means and driven by said element from set position.

11. In a talking-machine, the combination of record-rotating means, a driving element, means for presenting records to said record-rotating means, pneumatically-controlled means for driving said second-named means by said driving element, and manually settable valve mechanism controlling said second-named means.

12. In a talking-machine, the combination of record-rotating means, a rotatable record-carrier cooperating with said record-rotating means, and pneumatically-controlled means for controlling the movement of said carrier comprising manually settable valve mechanism and means for operating said mechanism in timed relation to the rotation of said record-carrier.

13. In a talking-machine, the combination of record-rotating means, a rotatable record-carrier cooperating with said record-rotating means and having positioning means thereon, pneumatically-controlled means for actuating said carrier, a member cooperating with said positioning means on said carrier and movable relative thereto, means for actuating said member, and means controlled by said member operating when said member is moved in one direction relative to said positioning means to cause said pneumatically-controlled means to actuate said carrier and when said member moves in the opposite direction relative to said positioning means to discontinue the operation of said pneumatically-controlled means.

14. In a talking-machine, the combination of record-rotating means, a rotatable record-carrier cooperating with said record-rotating means and having positioning means thereon corresponding with the records on said carrier, pneumatically-controlled means for actuating said carrier, a member cooperating with said positioning means on said carrier and movable relative thereto, means for actuating said member at the end of the record-playing operation, and means controlled by said member operating when said member is moved in one direction relative to said positioning means to cause said pneumatically-controlled means to actuate said carrier and when said member moves in the opposite direction relative to said positioning means to discontinue the operation of said pneumatically-controlled means.

15. In a talking-machine, the combination of record-rotating means, a rotatable record-carrier cooperating with said record-rotating means and having positioning means thereon corresponding with the records on said carrier, pneumatically-controlled means for actuating said carrier, a member cooperating with said positioning means on said carrier and movable relative thereto, a movable tone-arm, means controlled by said tone-arm for actuating said member, and means controlled by said member operating when said member is moved in one direction relative to said positioning means to cause said pneumatically-controlled means to actuate said carrier and when said member moves in the opposite direction relative to said positioning means to discontinue the operation of said pneumatically-controlled means.

16. In a talking-machine, the combination of record-rotating means, a rotatable record-carrier cooperating with said record-rotating means pneumatically-controlled means for actuating said carrier, a movable locking member, said carrier having portions corresponding with the number of records thereon and adapted to be engaged by said locking member, means for actuating said locking member, and means controlled by said locking member operating when said member is moved to releasing position to cause said pneumatically-controlled means to actuate said carrier and when said locking member moves to locking position to discontinue the operation of said pneumatically-controlled means.

17. In a talking-machine, the combination of record-rotating means, a rotatable record-carrier cooperating with record-rotating means and having positioning means corresponding with the records on said carrier, pneumatically-controlled means for actuating said carrier, a member cooperating with said positioning means on said carrier and movable relative thereto, means for actuating said member in one direction, said member being automatically movable in the opposite direction, and means controlled by said member operating when said member is moved in one direction relative to said positioning means to cause said pneumatically-controlled means to actuate said carrier and when said member moves in the opposite direction relative to said positioning means to discontinue the operation of said pneumatically-controlled means.

18. In a talking-machine, the combination of record-rotating means, a rotatable record-carrier cooperating with said record-rotating means and having positioning means thereon and corresponding with the records on said carrier, pneumatically-controlled means for actuating said carrier, a member cooperating with said positioning means on said carrier and movable relative thereto, means for actuating said member in one direction, said member being automatically movable in the opposite direction, and means controlled by said member operating when said member is moved by said third-named means to cause said pneumatically-controlled means to actuate said carrier and when said member moves automatically in the opposite direction to discontinue the operation of said pneumatically-controlled means.

19. In a talking-machine, the combination of record-rotating means, a rotatable record-carrier cooperating with said record-rotating means, pneumatically-controlled means for actuating said carrier, a movable locking member, said carrier having portions corresponding with the number of records thereon and adapted to be engaged by said locking member, means for actuating said locking member, a movable tone-arm, means controlled by said tone-arm for actuating said movable locking member, and means controlled by said locking member operating, when said member is moved to releasing position, to cause said pneumatically-controlled means to actuate said carrier and when said locking member moves to locking position to discontinue the operation of said pneumatically-controlled means.

20. In a talking-machine, the combination of record-rotating means, a rotatable record-carrier cooperating with said record-rotating means and having positioning means thereon, pneumatically-controlled means for actuating said carrier and comprising manually settable controlling mechanism controlling the position to which said carrier is rotated, a member cooperating with said positioning means and movable relative thereto, means for actuating said member, means controlled by said member operating when said member is moved in one direction relative to said positioning means to cause said pneumatically-controlled means to actuate said carrier and when said member moves in the opposite direction relative to said positioning means to discontinue the operation of said pneumatically-controlled means, and means whereby said member remains in the position to which it is actuated until said carrier has moved to the position determined by said settable controlling mechanism.

21. In a talking-machine, the combination of record-rotating means, a rotatable record-carrier cooperating with said record-rotating means and having positioning means thereon, pneumatically-controlled means for actuating said carrier, a member cooperating with said positioning means on said carrier and movable relative thereto, means for actuating said member, and means controlled by said member operating when said member is moved in one direction relative to said positioning means to cause said pneumatically-controlled means to actuate said carrier and when said member moves in the opposite direction relative to said positioning means to discontinue the operation of said pneumatically-controlled means and comprising pneumatic mechanism having a controlling-valve, the latter being positioned for control by said member.

22. In a talking-machine, the combination of record-rotating means, a rotatable record-carrier cooperating with said record-rotating means and having positioning means thereon, pneumatically-controlled means for actuating said carrier and comprising manually settable controlling mechanism controlling the position to which said carrier is rotated, a member cooperating with said positioning means and movable relative thereto, means for actuating said member, means controlled by said member operating when said member is moved in one direction relative to said positioning means to cause said pneumatically-controlled means to actuate said carrier and when said member moves in the opposite direction relative to said positioning means to discontinue the operation of said pneumatically-controlled means, and means whereby said member remains in the position to which it is actuated until said carrier has moved to the position determined by said settable controlling mechanism and comprising pneumatic mechanism having a controlling-valve, the latter being positioned for control by said member.

23. In a talking-machine, the combination of record-rotating means, a rotatable record-carrier cooperating with said record-rotating means and having positioning means thereon, pneumatically-controlled means for actuating said carrier, a member cooperating with said positioning means on said carrier and movable relative thereto, means for actuating said member, a movable tone-arm provided with a reproducer device, pneumatic means operative to lift said device clear of the record following the playing of the latter, and means controlled by said member operating when said member is moved in one direction relative to said positioning means to cause said pneumatically-controlled means to actuate said carrier and when said member moves in the opposite direction relative to said positioning means to discontinue the operation of said pneumatically-controlled means and condition said fourth-named means for actuation to effect lowering of said device.

24. In a talking-machine, the combination of record-rotating means, a rotatable record-carrier cooperating with said record-rotating means and having positioning means thereon, pneumatically-controlled means for actuating said carrier, a member cooperating with said positioning means on said carrier and movable relative thereto, means for actuating said member, and comprising manually settable controlling mechainsm controlling the position to which said carrier is rotated, a member cooperating with said positioning means and movable relative thereto, means for actuating said member, a movable tone-arm provided with a reproducer device, pneumatic means operative to lift said device clear of the record following the playing of the latter, and means actuated by said member operating when said member is moved in one direction relative to said positioning means to cause said pneumatically-controlled means to actuate said carrier and when said member moves in the opposite direction relative to said positioning means to discontinue the operation of said pneumatically-controlled means and condition said fourth-named means for actuation to effect lowering of said device.

25. In a talking-machine, the combination of record-rotating means, a movable tone-arm provided with a stylus-equipped reproducer device, and pneumatic means operating automatically in the movement of said tone-arm to a position adjacent the beginning of the record-groove to present a different stylus in position for the next playing operation.

26. In a talking-machine, the combination of record-rotating means, a movable tone-arm provided with a holder for styluses movably mounted on said device, and pneumatic means operating automatically in the movement of said tone-arm to a position adjacent the beginning of the record-groove to shift said holder, for the purpose set forth.

27. In a talking-machine, the combination of record-rotating means, a movable tone-arm provided with a stylus-equipped reproducer device, and pneumatically operated pawl means operating automatically in the movement of said tone-arm to a position adjacent the beginning of the record-groove to present a different stylus in position for the next playing operation.

28. In a talking-machine, the combination of record-rotating means, a movable tone-arm provided with a reproducer device, a holder for styluses movably mounted on said device, and pneumatically operated pawl means operating automatically in the movement of said tone-arm to a position adjacent the beginning of the record-groove to shift said holder, for the purpose set forth.

29. In a talking-machine, the combination of record-rotating means, a movable tone-arm provided with a stylus-equipped reproducer device, means for moving said tone-arm to a position adjacent the beginning of the record-groove, and pneumatic means controlled by said second-named means operating automatically in the movement of said tone-arm to said position to present a different stylus in position for the next playing operation.

30. In a talking-machine, the combination of record-rotating means, a movable tone-arm provided with a reproducer device, a holder for styluses movably mounted on said device, means for moving said tone-arm to a position adjacent the beginning of the record-groove, and pneumatic means operating automatically in the movement of said tone-arm to said position to shift said holder, for the purpose set forth.

31. In a talking-machine, the combination of record-rotating means, a movable tone-arm provided with a stylus-equipped reproducer device, means for moving said tone-arm to a position adjacent the beginning of the record-groove, and pneumatic means for causing said device to present a different stylus in position for the next playing operation comprising a bellows and a valve controlling the operation of said bellows and momentarily operated by said second-named means in moving to said position.

32. In a talking-machine, the combination of a motor, an air-pump operated by said motor, starting means for said motor, record-rotating means, a movable tone-arm having a reproducer device movable toward and away from the record, pneumatically-controlled means in communication with said pump for controlling the position of said reproducer device and operating, upon the conclusion of the playing of a record, to become so conditioned that said reproducer device will lower into record-groove-engaging position responsive to the operation of said pump, and means operating automatically upon the conclusion of the playing of a record to prevent the operation of said third-named means responsive to the condition produced by said pump and continuing after the operation of the latter ceases.

33. In a talking-machine, the combination of a motor, an air-pump operated by said motor, starting means for said motor, record-rotating means, a movable tone-arm having a reproducer device movable toward and away from the record, pneumatically-controlled means in communication with said pump for controlling the position of said reproducer device and operating, upon the conclusion of the playing of a record, to become so conditioned that said reproducer device will lower into record-groove-engaging position responsive to the operation of said pump, and means operating automatically upon the conclusion of the playing of a record to prevent the operation of said third-named means responsive to the condition produced by said pump and continuing after the operation of the latter ceases and automatically operative, upon the actuation of said starting means, to permit said reproducer device to become lowered to a record beneath said device.

34. In a talking-machine, the combination of record-rotating means, a movable tone-arm having a reproducer device, a drive element for said means, a controlling element for said drive element, and pneumatic means controlling the movement of said controlling element to a position for discontinuing the drive of said record-rotating means and operated by the movement of said tone-arm to a position adjacent the beginning of the record-groove.

35. In a talking machine, the combination of record-rotating means, means for automatically changing records, a movable tone-arm provided with a reproducer device, pneumatic means for lifting said device clear of the record following the playing of the latter, pneumatic means for moving said tone-arm to a position in which said device extends adjacent the beginning of the record-groove, means controlled by the position of the tone-arm at the end of the playing of the record for actuating said first and second named pneumatic means to first lift said device clear of the record and then swing said tone-arm to a position adjacent the beginning of the record groove, and means for holding said device in raised position during the operation of said second-named means.

36. In a talking machine, the combination of record-rotating means, means for automatically changing records, a movable tone-arm provided with a reproducer device, pneumatic means for lifting said device clear of the record following the playing of the latter, pneumatic means for moving said tone-arm to a position in which said device extends adjacent the beginning of the record-groove, means controlled by the position of the tone-arm at the end of the playing of the record for actuating said first and second named pneumatic means to first lift said device clear of the record and then swing said tone-arm to a position adjacent the beginning of the record groove, means for holding said device in raised position during the operation of said second-named means, and means operating automatically to lower said device to the newly positioned record.

AXEL F. LARSON.
CHARLIE W. ANDERSON.